(12) United States Patent
Hosoya

(10) Patent No.: US 6,970,972 B2
(45) Date of Patent: Nov. 29, 2005

(54) HIGH-AVAILABILITY DISK CONTROL DEVICE AND FAILURE PROCESSING METHOD THEREOF AND HIGH-AVAILABILITY DISK SUBSYSTEM

(75) Inventor: Mutsumi Hosoya, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 10/626,049

(22) Filed: Jul. 23, 2003

(65) Prior Publication Data
US 2004/0139365 A1 Jul. 15, 2004

(30) Foreign Application Priority Data
Dec. 27, 2002 (JP) .............................. 2002-378956

(51) Int. Cl.$^7$ ................ G06F 12/12; G06F 11/00; G06F 13/00
(52) U.S. Cl. ................ 711/113; 711/138; 711/163; 711/165; 710/316; 714/5; 714/6
(58) Field of Search ................ 711/113, 138, 163, 711/165; 710/316; 714/5, 6

(56) References Cited

U.S. PATENT DOCUMENTS

| | | | |
|---|---|---|---|
| 4,710,926 A | 12/1987 | Brown et al. | |
| 5,386,551 A | 1/1995 | Chikira | |
| 5,615,330 A | 3/1997 | Taylor | |
| 5,724,501 A | 3/1998 | Dewey et al. | |
| 5,724,542 A | 3/1998 | Taroda et al. | |
| 6,338,101 B1 | 1/2002 | Kakimi | |
| 6,353,898 B1 | 3/2002 | Wipfel et al. | |
| 2001/0004754 A1 | 6/2001 | Murayama | |
| 2001/0032324 A1 | 10/2001 | Slaughter et al. | |
| 2001/0047482 A1 | 11/2001 | Harris et al. | |
| 2001/0047514 A1 | 11/2001 | Goto et al. | |
| 2003/0046460 A1 | 3/2003 | Inoue et al. | |
| 2003/0084237 A1 | 5/2003 | Yoshida et al. | |
| 2003/0182516 A1 | 9/2003 | Fujimoto | |
| 2003/0204683 A1 | 10/2003 | Okumoto et al. | |
| 2003/0229757 A1 | 12/2003 | Hosoya et al. | |
| 2004/0103244 A1 | 5/2004 | Fujimoto et al. | |

FOREIGN PATENT DOCUMENTS

| | | | |
|---|---|---|---|
| JP | 09-198308 A | | 7/1997 |
| JP | 200024243 A | * | 11/2000 |
| JP | 2002-041348 | | 2/2002 |

\* cited by examiner

*Primary Examiner*—Jack Lane
(74) *Attorney, Agent, or Firm*—Townsend and Townsend and Crew LLP

(57) ABSTRACT

This invention provides a high-availability disk control device and a failure recovery processing method thereof. In one embodiment, a disk control device comprises a plurality of host interface modules configured to interface with a computer; a plurality of disk interface modules configured to interface with a storage device; a plurality of cache memory modules configured to temporarily store data read from or written to the storage device; and a switch network connecting the various modules. Each of the host interface modules is configured to execute data transfers between the computer and the cache memory modules, and each of the disk interface modules is configured to execute data transfers between the storage device and the cache memory modules. Each of the various modules includes identification information providing unique identification within the switch network. The switch network includes a memory containing path information based on the identification information for data transfer paths among the various modules. Each cache memory module is configured to monitor failure in that module and to control changing of the path information relating to that module in the memory of the switch network.

38 Claims, 18 Drawing Sheets

FIG.1
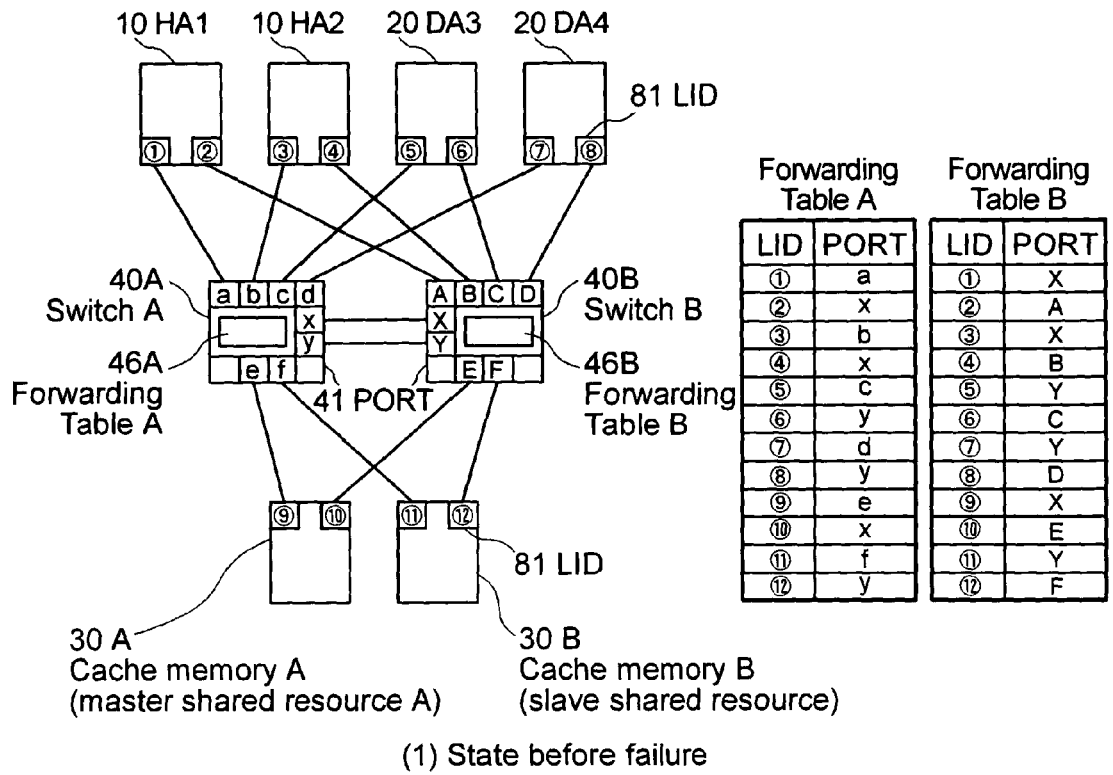
(1) State before failure
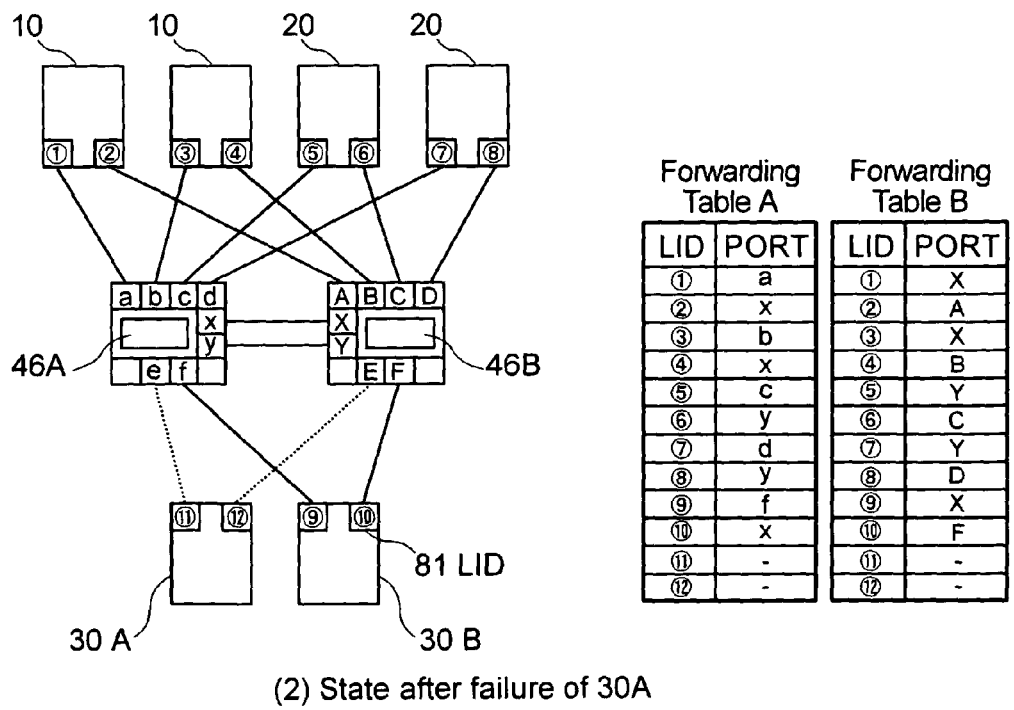
(2) State after failure of 30A

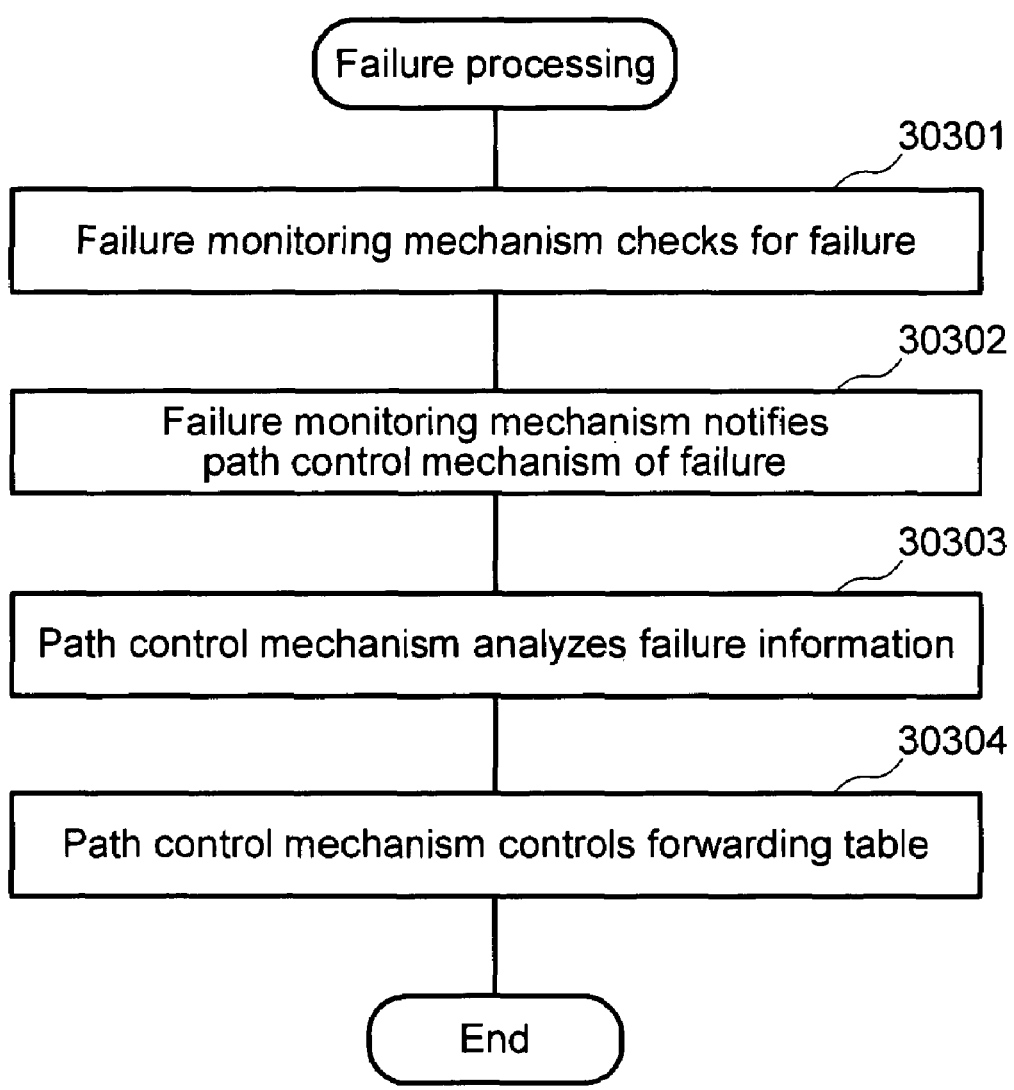

HIGH-AVAILABILITY DISK CONTROL DEVICE AND FAILURE PROCESSING METHOD THEREOF AND HIGH-AVAILABILITY DISK SUBSYSTEM

CROSS-REFERENCES TO RELATED APPLICATIONS

This application relates to and claims priority from Japanese Patent Application Number 2002-378956, filed on Dec. 27, 2002, the entire disclosure of which is incorporated herein by reference.

BACKGROUND OF THE INVENTION

The present invention relates to a control device for disk system devices storing data in a plurality of magnetic disk devices.

A high degree of reliability is required in electronic commerce transactions between companies and in the financial system. Core storage systems, which are central to these transactions, need to have an extremely high degree of availability. A disk control device widely used in these core storage systems is equipped with an automatic failure recovery function in which redundancy is used internally to provide high availability. If a failure takes place, the malfunctioning section is automatically separated and operations are continued with a functioning redundant section.

For example, FIG. 9 shows a well-known conventional disk control device equipped with: a plurality of host interface modules 1X performing data transfers with a host computer 60; a plurality of disk interface modules 2X performing data transfers with a magnetic disk device 70; cache memory modules 3X temporarily storing data for the magnetic disk device 70; and resource management modules 5X storing control information relating to the disk control device 104 (e.g., information relating to data transfer control between the host interface modules 1X and the disk interface modules 2X and the cache memory modules 3X, management information for data stored in the magnetic disk device 70).

The host interface modules 1X and the disk interface modules 2X and the cache memory modules 3X are connected by a data interface signal 6. In some cases, a switch 4X may be used in the connection between the host interface modules 1X and the cache memory modules 3X and between the disk interface modules 2X and the cache memory modules 3X. The host interface modules 1X, the disk interface module 2X, and the resource management modules 5X are connected by a management interface signal 7. The use of a switch in the connection between the resource management modules 5X, the host interface modules 1X, and the disk interface modules 2X is optional.

As a result, the resource management modules 5X and the cache memory modules 3X can be accessed from all the host interface modules 1X and the disk interface modules 2X.

As shown in FIG. 12, the host interface module 1X includes: a channel protocol processing module 90 processing input/output involving the host interface signal 1; an internal protocol processing module 8X processing input/output operations involving the data interface signal 6; a processor interface 17 processing input/output operations involving a management interface signal 7; a processor 14 controlling input/output operations involving the host computer 60; and a local memory 15.

The disk interface modules 2X are formed with a structure similar to that of the host interface modules except that: a disk interface signal 2 is connected to the channel protocol processing module 90 instead of the host interface signal 1; and in addition to control operations involving the host interface modules, the processor 14 also executes RAID functions.

The host interface module 1X and the disk interface module 2X communicates with the cache memory module 3X through packet transfers using packets to which the destination address is added to the start of the data.

A packet generated through control operations performed by the processor 14 in the host interface module 1X or the disk interface module 2X is sent to the switch 4X by way of the data interface signal 6. As shown in FIG. 10, the switch 4X is equipped with: multiple path interfaces 41X connected to the data interface signal 6; packet buffers 43; and address latches 44. The path interface 41X contains a header analyzing module 42X that extracts the address information from packets. The packet address analyzed and extracted in this manner is captured by the address latch 44. The sent packet is stored in the packet buffer 43 by way of the path interface 41X. A selector control signal 47 based on the packet destination is generated from the address latch 44 and the destination of the stored packet is selected by the selector 48.

At the switch 4X, the packets are transferred to the destination cache memory module 3X by way of the data interface signal 6 again. As shown in FIG. 11, the cache memory module 3X is equipped with: multiple data path interfaces 31X connected to the data interface signal 6; packet buffers 33; arbitration circuits 39; and a selector 38. The data path interface 31X includes a header analysis module 32X for extracting address information from packets. The packet address analyzed and extracted in this manner is captured by the arbitration circuit 39. The sent packet is stored in the packet buffer 33 by way of the path interface 31X. The arbitration circuit 39 selects one of the multiple data path interfaces 31X and generates a selector control signal based on the selection result. By switching the selector 38 with this selector control signal, the contents of the desired packet buffer 33 can be written to the cache memory 37 by way of the memory control circuit 35. If the packet stored in the packet buffer 33 is a memory read request, the process described above is performed in reverse to send back the contents of the specified region of the cache memory 37 to the host interface module 1X or the disk interface module 2X.

When communicating with the resource management module 5X, the host interface module 1X and the disk interface module 2X perform packet transfer operations similar to those performed with regard to the cache memory module except for the use of the management interface signal 7 instead of the data interface signal 6. The resource management module 5X is formed with a structure similar to what is shown in FIG. 11 except for the cache memory module and the interface signal.

The cache memory module 3X and the resource management module 5X are resources shared by the system and accessed by the multiple host interface modules 1X and the disk interface modules 2X, and their accessibility is a major factor in system reliability. As a result, a redundant architecture equipped with multiple elements having the same functions is provided. With this type of design, if there is a failure in one of the elements, the remaining operational elements can be used to continue operations. More specifically, if one of the processors 14 in the host interface module 1X or the disk interface module 2X detects a failure in one of the multiple cache memory modules 3X or the resource management modules 5X, the processor that detects the failure isolates the failed section, makes the remaining cache memory modules 3X or the resource management modules 5X inherit the operations thereof, and all the other processors 14 are notified of the failure. The processors receiving the failure notification update system architecture/communication routes based on the failure. This allows failed sections to be isolated in any of the host interface modules 1X and the disk interface modules 2X.

In the conventional disk control device 104 of FIG. 9, the updating of system architecture/communication routes in response to failures in shared resources, e.g., a cache memory module 3X or a resource management module 5X, is performed in a distributed manner by the processors in the multiple host interfaces 1X and the disk interfaces 2X. As a result, the handling of failures in shared resources requires complex processing, including broadcast communications to processors arranged in a distributed manner.

In another conventional technology to improve reliability in disk control devices, a failure processing mechanism provides high-availability network communication between shared system resources and system resource clients (see, e.g., Japanese laid-open patent publication number 2002-41348). As in the conventional technology described above, this conventional technology, involves updating routing tables for each of multiple processors.

Another proposed conventional technology for increasing availability of disk control devices (see, e.g., Japanese laid-open patent publication number 2000-242434) is a storage device system interposed between a host computer and a disk array subset and equipped with a switch performing address conversions between the two elements. In this conventional technology, a failure in one of multiple disk array subsets is handled by updating routes and the like by interpreting packets within the switch and modifying requests to the failed sections so that their destinations are changed to redundant sections having equivalent functions.

Failures in shared resources, e.g., cache memory modules or resource management modules, can lead to malfunctions in applications executed by the host computer and must therefore be accompanied by quick recovery operations. However, the conventional technologies shown in FIG. 9, FIG. 10, FIG. 11, and FIG. 12 all require routing changes for the host interface modules 1X and the disk interface modules 2X. This makes failure handling time-consuming, prevents continuation of read/write tasks from the host computer, and can lead to performance degradation in the storage system and malfunctions in application programs. Also, this failure processing requires high-performance processors and complex control programs in the host interface modules 1X and the disk interface modules 2X, leading to increased production costs and decreased reliability. Similar problems are involved in the case of the conventional technology described in patent document 1, since it requires changes to be made in routing tables for multiple processors.

First, in the conventional technology disclosed in the patent document 2, a switch with a function for changing packet destinations can be used so that processing within the switch can handle failures, e.g., by having multiple disk array subsets take over functions from each other. However, this involves the interpreting of the destination for each packet, requiring time-consuming processing during normal operations in addition to when a failure takes place. This leads to degraded performance in the storage system.

SUMMARY OF THE INVENTION

Embodiments of the present invention overcome the problems of the conventional technologies described above and provide a high-availability disk control device and a failure recovery processing method thereof that handles failures quickly and reliably while not causing performance degradation during normal operations. One feature of the present invention is to provide a high-availability disk control device that at no time, including at times of failure, leads to performance degradation in the storage system or to malfunctions in host applications.

In accordance with an aspect of the present invention, a disk control device comprises a plurality of host interface modules configured to interface with a computer; a plurality of disk interface modules configured to interface with a storage device; a plurality of cache memory modules configured to temporarily store data read from or written to the storage device; and a switch network connecting the host interface modules, the cache memory modules, and the disk interface modules, the switch network comprising at least one switch. Each of the host interface modules is configured to execute data transfers between the computer and the cache memory modules, and each of the disk interface modules is configured to execute data transfers between the storage device and the cache memory modules. Each of the host interface modules, the disk interface modules, and the cache memory modules includes identification information providing unique identification within the switch network. The switch network includes a memory containing path information based on the identification information for data transfer paths among the host interface modules, the disk interface modules, and the cache memory modules. Each of the cache memory modules is configured to monitor failure in the cache memory module and to control changing of the path information relating to the cache memory module in the memory of the switch network.

In accordance with another aspect of the invention, a disk control device comprises a plurality of host interface modules configured to interface with a computer; a plurality of disk interface modules configured to interface with a storage device; a plurality of cache memory modules configured to temporarily store data read from or written to the storage device; a plurality of resource management modules configured to store control information relating to data transfer among the cache memory modules and the host interface modules and the disk interface modules; and a switch network connecting the host interface modules, the cache memory modules, the resource management modules, and the disk interface modules, the switch network comprising at least one switch. Each of the host interface modules is configured to execute data transfers between the computer and the cache memory modules; and each of the disk interface modules is configured to execute data transfers between the storage device and the cache memory modules. Each of the host interface modules, the disk interface modules, the resource management modules, and the cache memory modules includes identification information providing unique identification within the switch network. The switch network includes a memory containing path information based on identification information for data transfer paths among the host interface modules, the disk interface modules, the resource management modules, and the cache memory modules. Each of the resource management modules is configured to monitor failure in the resource management module and to control changing of the path information relating to the resource management module in the memory of the switch network.

In accordance with another aspect of this invention, a failure recovery processing method for a disk control device comprises providing a plurality of host interface modules configured to interface with a computer; providing a plurality of disk interface modules configured to interface with a storage device; and providing a plurality of cache memory modules configured to temporarily store data read from or written to the storage device. Each of the host interface modules is configured to execute data transfers between the computer and the cache memory modules, and each of the disk interface modules is configured to execute data transfers between the storage device and the cache memory modules. Each of the host interface modules, the disk interface modules, and the cache memory modules includes identification information providing unique identification. The method further comprises connecting the host interface modules, the cache memory modules, and the disk interface modules; providing a memory containing path information based on identification information for data transfer paths among the host interface modules, the disk interface modules, and the cache memory modules; and changing the path information for the data transfer paths in the memory, when a failure takes place in one of the cache memory modules, to avoid a failed cache memory module.

In accordance with another aspect of this invention, a disk array system for connecting to a plurality of computers via a first network comprises a plurality of magnetic disk devices and a disk control device connected via a second network. The disk control device comprises a plurality of host interface modules including an interface with the computers; a plurality of disk interface modules including an interface with the magnetic disk devices; and a plurality of cache memory modules connected between the plurality of host interface modules and the plurality of disk interface modules via a switch network having at least one switch. The plurality of host interface modules, the plurality of disk interface modules, and the plurality of cache memory modules each include an ID providing unique identification within the switch network. The switch includes a memory containing path information based on the IDs for data transfer paths among the host interface modules, the disk interface modules, and the cache memory modules. The disk control device comprises a mechanism for changing the path information in the memory of the switch and the IDs.

The switch network includes a processor and a memory storing a program executable by the processor. In specific embodiments, the program in the memory of the switch network includes a code module for changing the path information relating to the cache memory modules in response to an instruction from one of the cache memory modules upon detecting failure in the cache memory module, and for changing the path information relating to the resource management modules in response to an instruction from one of the resource management modules upon detecting failure in the resource management module.

BRIEF DESCRIPTION OF THE FIGURES

FIG. 1 is a diagram illustrating the principles involved in failure recovery operations in a disk control device according to the present invention.

FIG. 18 is a diagram showing an overview of failure recovery processing of a disk control device according to the present invention.

DETAILED DESCRIPTION OF THE INVENTION

The embodiments of the present invention will be described using the figures.

First Embodiment

FIG. 1, FIG. 2, FIG. 6, FIG. 7, and FIG. 8 show an embodiment of the present invention.

Figure 2:
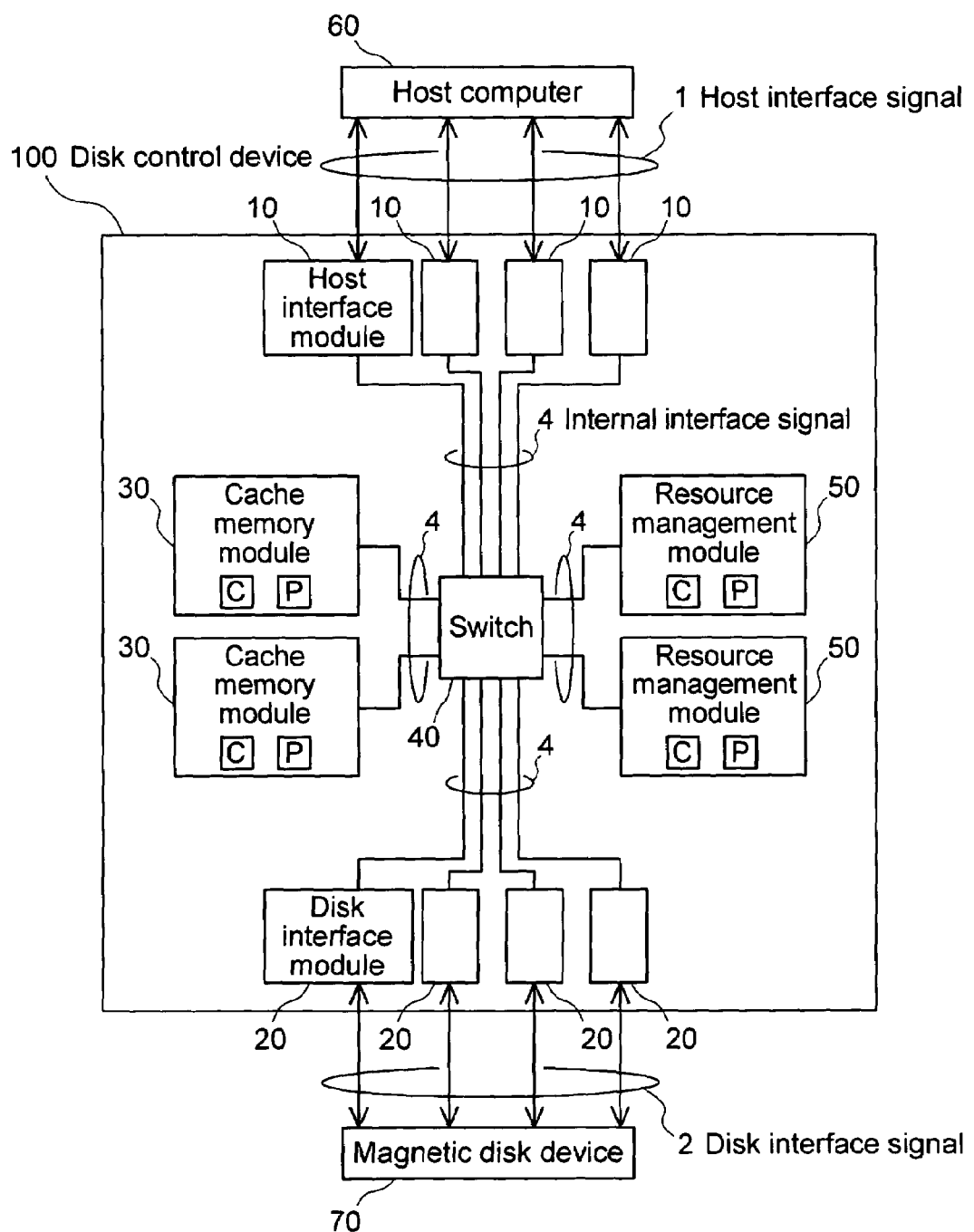
FIG. 2 is a diagram showing the architecture of a disk control device according to the present invention.

A disk control device 100 shown in FIG. 2 includes: interface modules (host interface module) 10 for a host computer 60; interface modules (disk interface module) 20 for a magnetic disk device 70; cache memory modules 30; a switch 40; and resource management modules 50. Internal interface signals 4, by way of the switch 40, connect the host interface modules 10 and the disk interface modules 20 as well as the cache memory module 30 and the resource management module 50. More specifically, all of the host interface modules 10 and all of the disk interface modules 20 can access all of the cache memory modules 30 or the resource management modules 50.

Figure 8:
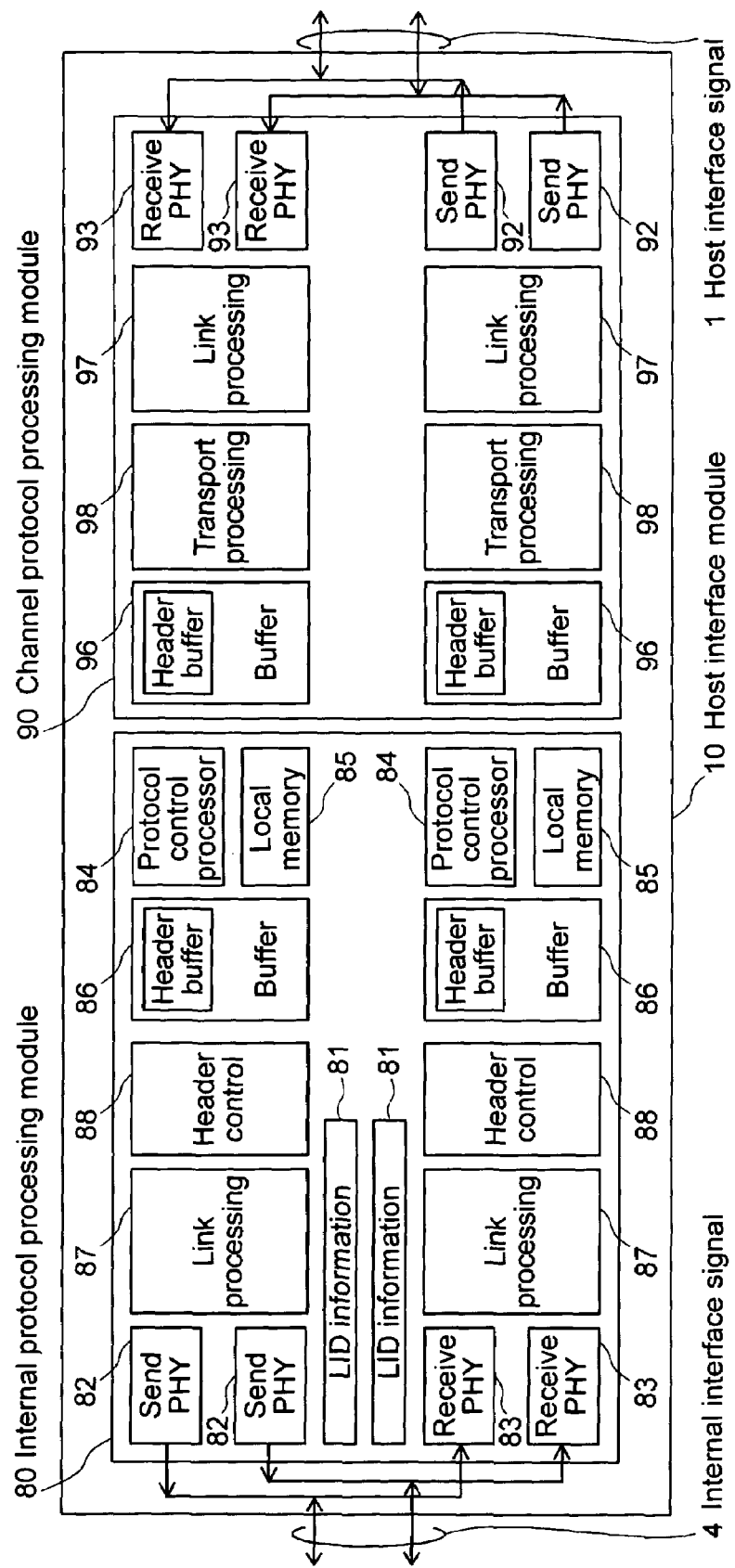
FIG. 8 is a diagram showing the architecture of a host interface module in a disk control device according to the present invention.
Figure 9:
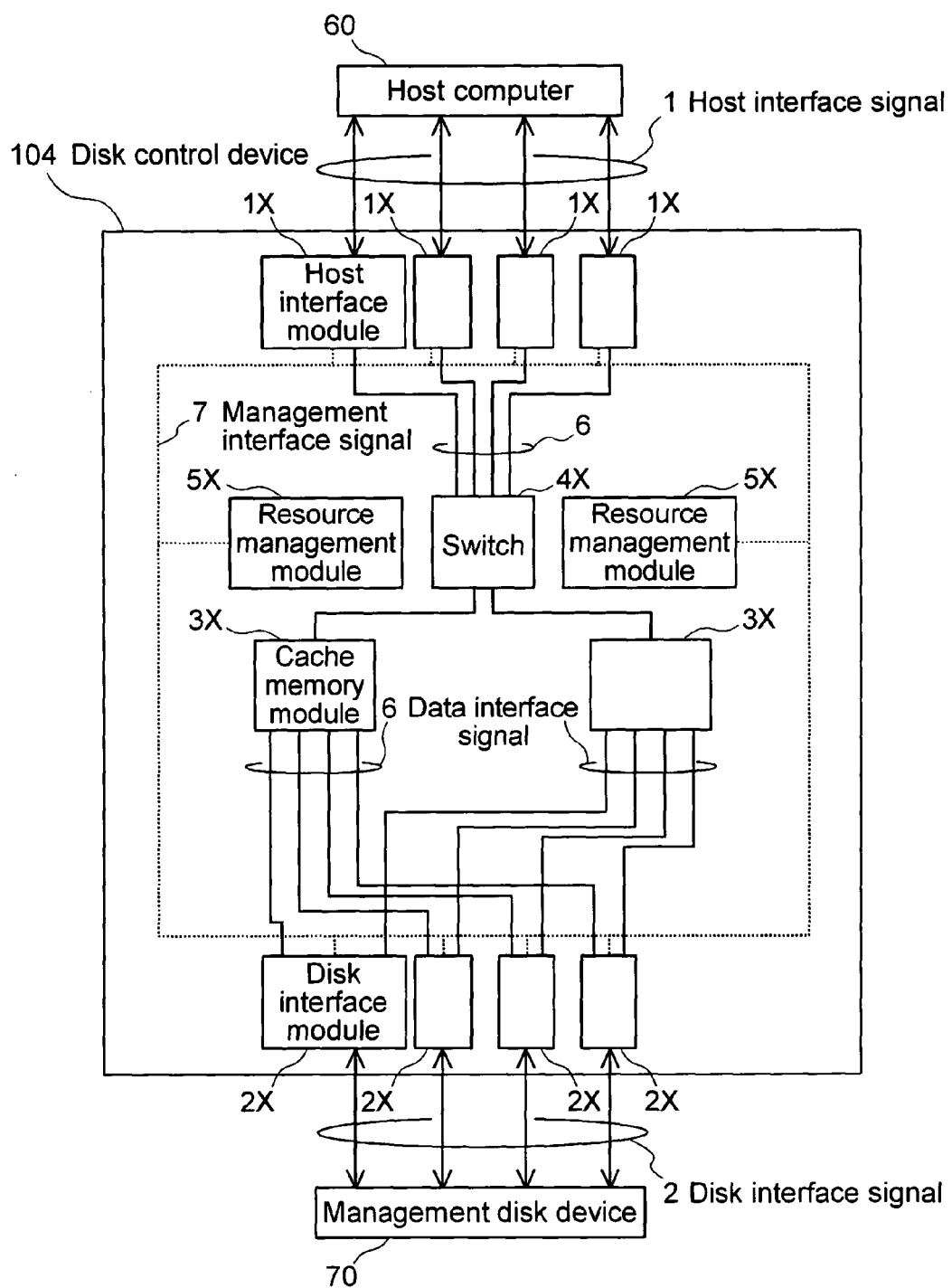
FIG. 9 is a diagram showing the architecture of a conventional disk control device.
Figure 10:
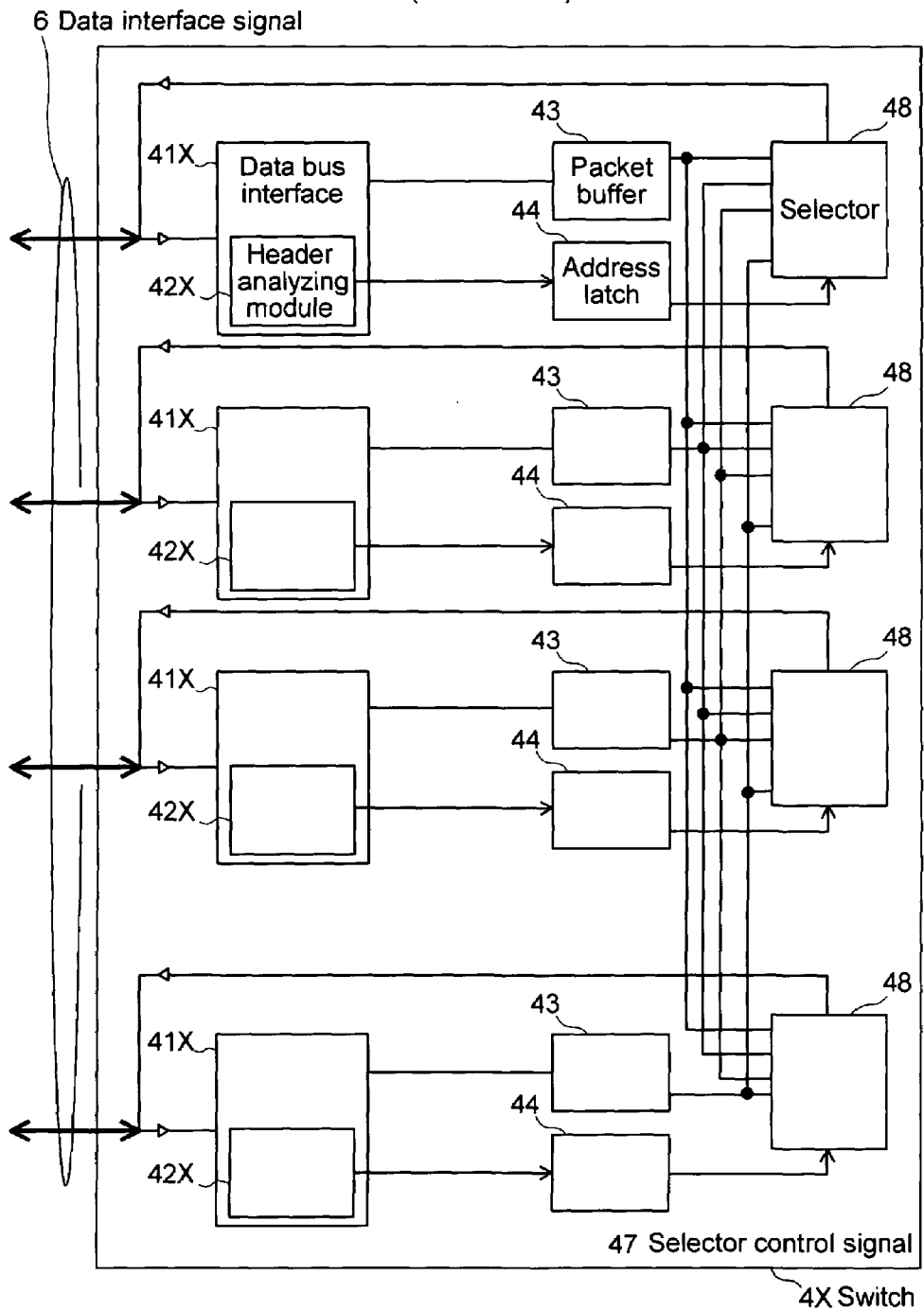
FIG. 10 is a diagram showing the structure of a switch in a conventional disk control device.
Figure 11:
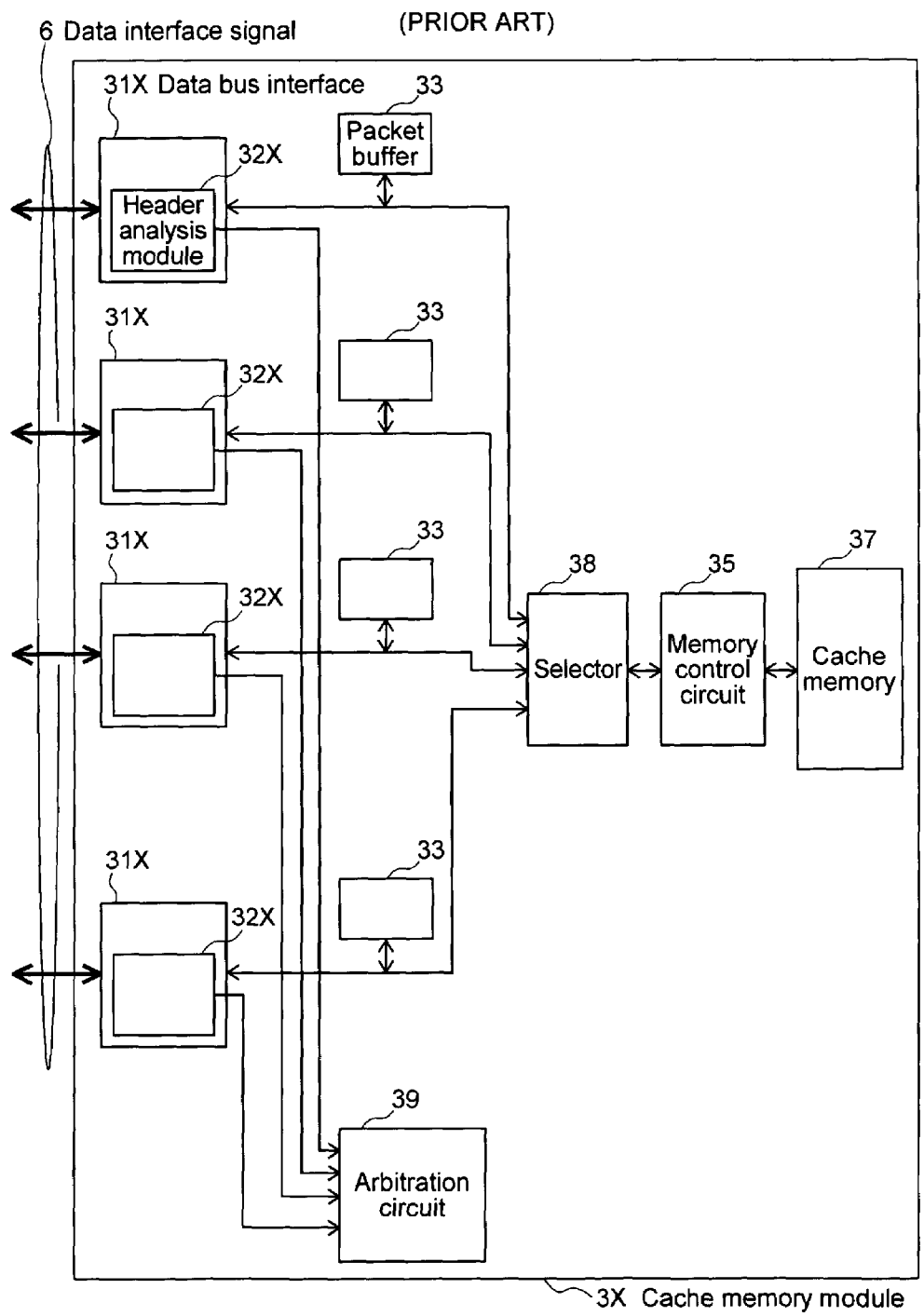
FIG. 11 is a diagram showing the architecture of a cache memory module in a conventional disk control device.
Figure 12:
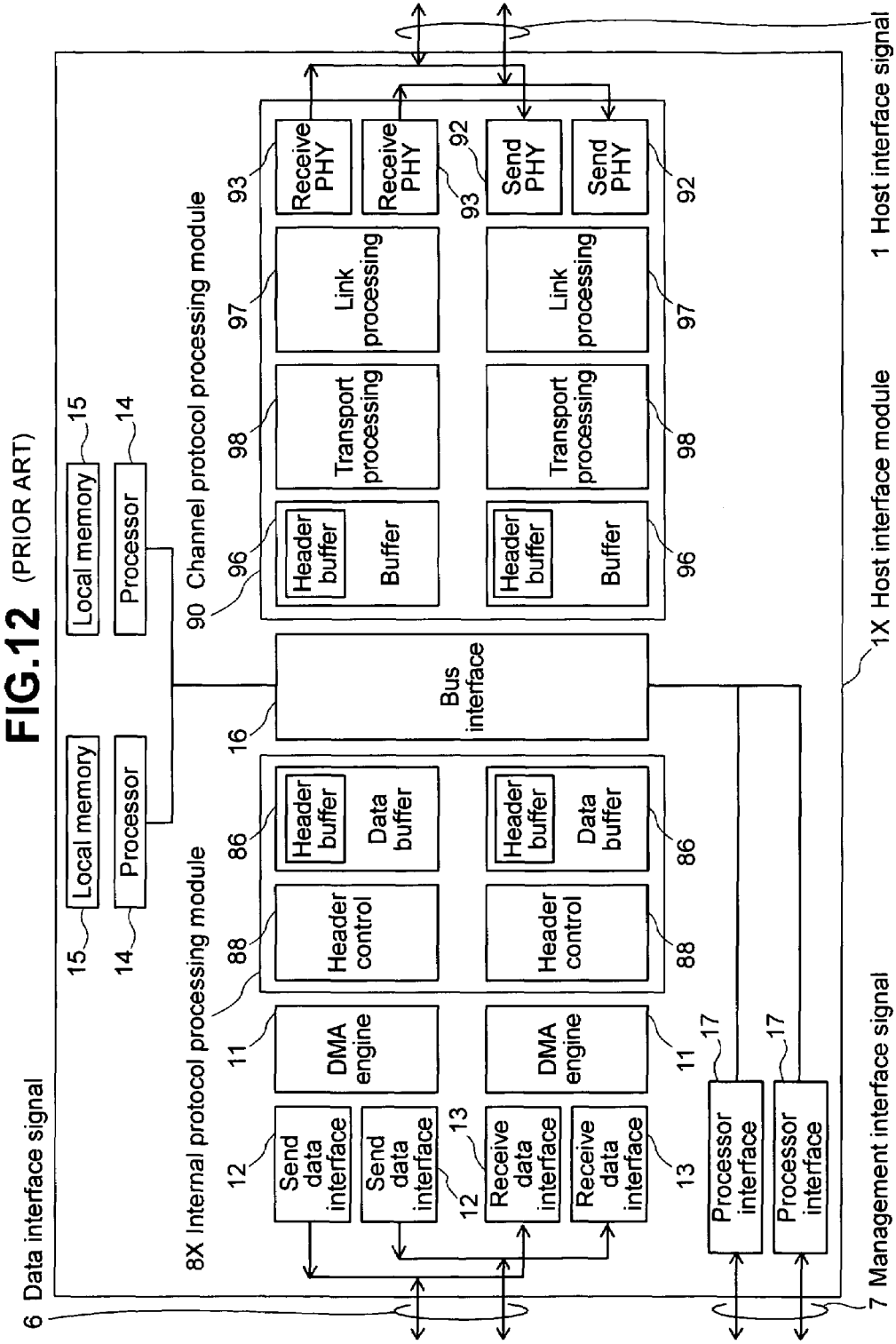
FIG. 12 is a diagram showing the architecture of a host interface module in a conventional disk control device.

As shown in FIG. 8, the host interface module 10 includes: a channel protocol processing module 90 performing input/output processing for a host interface signal 1; and an internal protocol processing module 80 performing input/output processing for a data interface signal 2. The host interface module 10 performs data transfers with the cache memory modules 30 and control information transfers with the resource management module 50.

The host interface module 10 converts the host interface signal 1 to the internal interface signal 4. The host interface module includes the channel protocol processing module 90 and the internal protocol processing module 80. The channel protocol processing module 80 includes the send PHY 92, the receive PHY 93, the link processing unit 97, the transport processing unit 98, and the buffer 96. The receive PHY 93 receives a bit stream of channel protocol packets from the host interface signal 1, and the send PHY 92 sends a bit stream of channel protocol packets to the host interface signal 1. The link processing unit 97 performs data link layer functions such as packet composition/decomposition and flow control operation. The transport processing unit 98 performs transport layer functions such as error check/retry operations. The buffer 96 holds payloads and headers of the channel protocol packets. The internal protocol processing module 80 includes the send PHY 82, the receive PHY 83, the link processing unit 87, the header control unit 88, the buffer 86, the protocol control processor 84, the local memory 85, and the LID information register 81. The send PHY 82 sends a bit stream of internal protocol packets to the internal interface signal 4, and the receive PHY 83 receives a bit stream of internal protocol packets from the internal interface signal 4. The link processing unit 87 performs the data link layer functions for the internal interface network. The header control unit 88 controls headers of internal protocol packets. The buffer 86 holds payloads and headers of the internal protocol packets. The protocol control processor controls the operations of the host interface module 10, and the local memory 85 is a working area of the processor 84. The LID information register 81 holds a unique identification information of the host interface module 10.

When a packet arrives at the receive PHY 93, its payload and header are stored in the buffer 96 by way of the link processing unit 97 and the transport processing unit 98. They are converted for the internal protocol packet format, and copied to the buffer 86. The copied payload and header are sent to the internal interface signal 4 by way of the link processing unit 87 and the send PHY 82. When a packet arrives at the receive PHY 83, its payload and header are stored in the buffer 86 by way of the link processing unit 87 and the header control unit 88. They are converted for the channel protocol packet format, and copied to the buffer 96. The copied payload and header are sent to the host interface signal 1 by way of the transport processing unit 98, the link processing unit 97 and the send PHY 92.

The structure of the disk interface module 20 is similar to that of the host interface module, but a disk interface signal 2 is used instead of the host interface signal 1, and the disk interface module 20 performs data transfers between the magnetic disk device 70 and the cache memory module 30 as well as the transfer of control interface between the magnetic disk device 70 and the resource management module 50.

Figure 7:
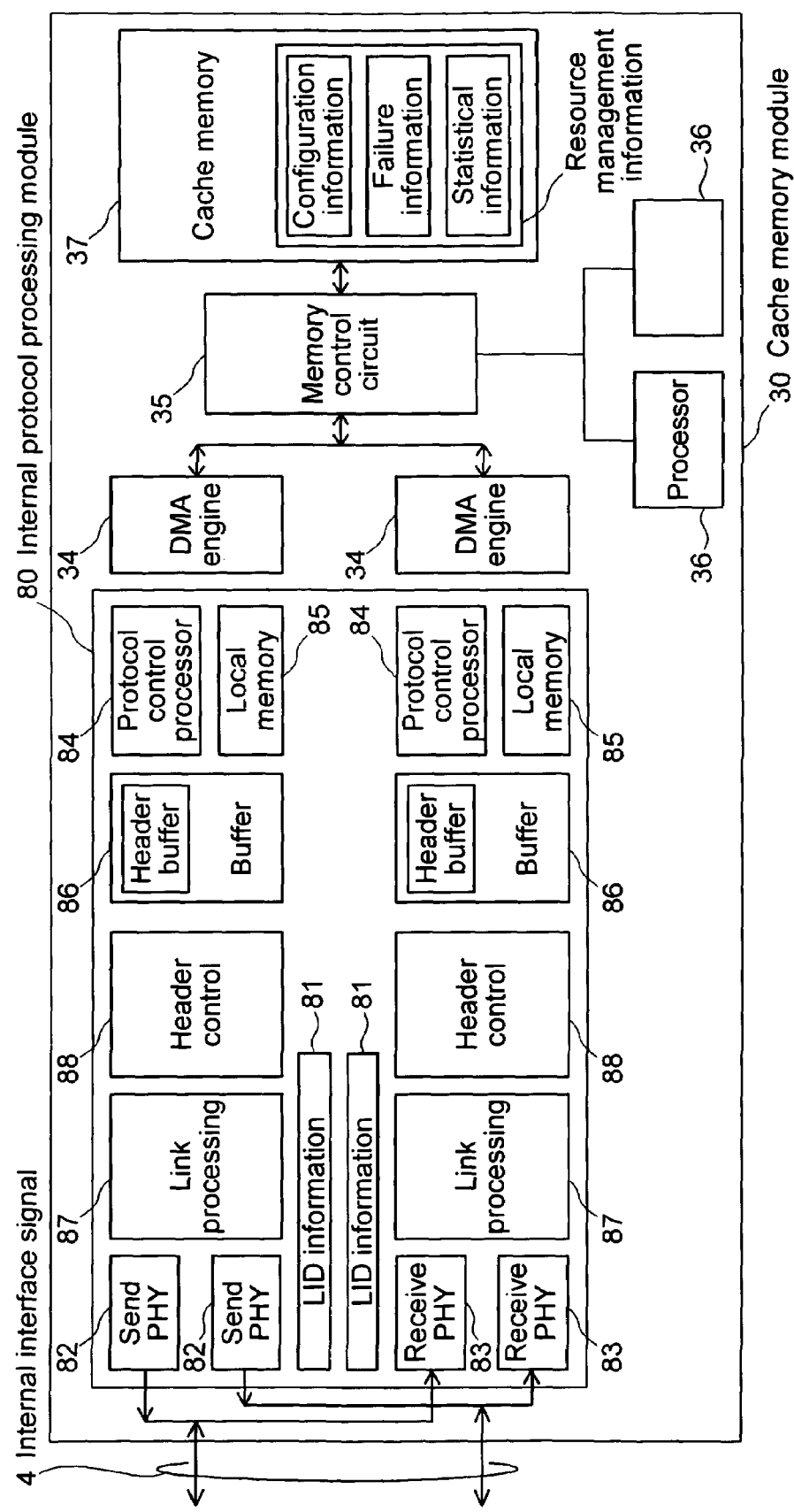
FIG. 7 is a diagram showing the architecture of a cache memory module in a disk control device according to the present invention.

As shown in FIG. 7, the cache memory module 30 includes: an internal protocol processing module 80 performing input/output processing with regard to the internal interface signal 4; a processor 36; a cache memory 37; a memory control circuit 35; and a DMA engine 34. The cache memory module 30 temporarily stores data to be recorded to the magnetic disk device 70 and data read from the magnetic disk device.

FIG. 7 shows the block diagram of the cache memory module 30. It is composed of the internal protocol processing module 80, the DMA engine 34, the memory control circuit 35, the processor 36, and the cache memory 37. The internal protocol processing module 80 transfers packet to/from the internal protocol network. The DMA engine 34 performs DMA operations to/from the cache memory 37 by way of the memory control circuit 35. The processor 36 controls the operation of the cache memory module 30.

The resource management module 50 is also formed with a structure similar to that of the cache memory module 30 and maintains management control information such as the system architecture.

Figure 6:
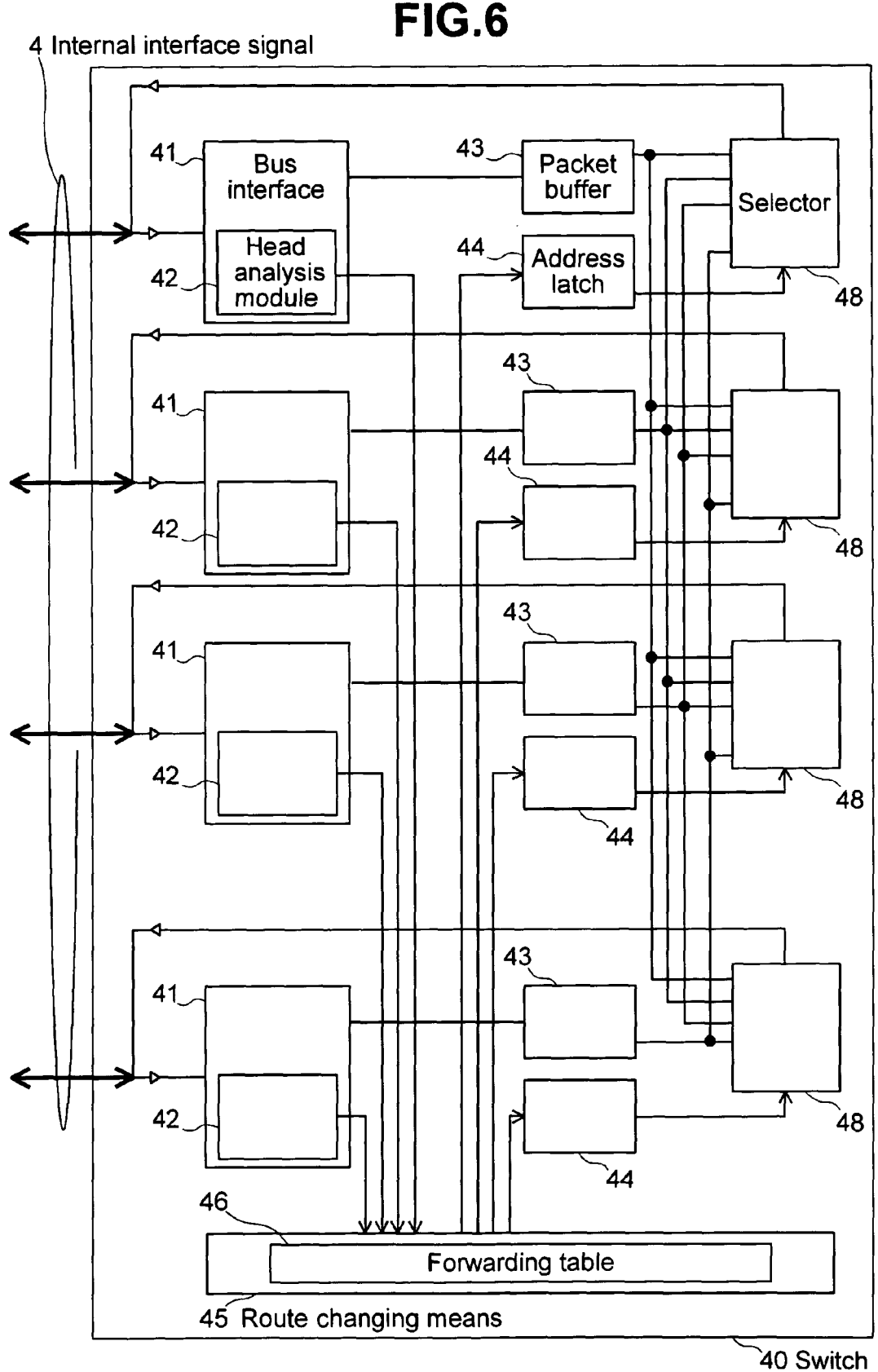
FIG. 6 is a diagram showing the architecture of a switch in a disk control device according to the present invention.

As shown in FIG. 6, the switch 40 includes: multiple path interfaces 41 connected to the internal interface signal 4; packet buffers 43; address latches 44; and selectors 48. The switch 40 performs path connections between the host interface module 10 and the disk interface module 20, the cache memory module 30, and the resource management module 40.

In order to improve availability, it would also be possible to have multiple ports formed on the host interface module 10, the disk interface module 20, the cache memory module 30, and the resource management module 50, with multiple transfer paths being arranged between these and the switch 40.

The internal protocol processing module 80 of the host interface module 10, the disk interface module 20, the cache memory module 30, and the resource management module 50 each include an LID information 81 for storing a local ID (LID) that uniquely identifies within a switch network the destination connected to the internal interface signal 4.

The switch 40 includes a forwarding table 46 indicating associations between port numbers (positions of path interfaces 41) and LIDs. FIG. 1 (1) shows an example of a forwarding table 46. In this example, two host interfaces 10 and two disk interfaces 20 are connected, by way of two switches 40A, 40B, to two cache memories (shared resources) 30A, 30B. The host interfaces 10, the disk interfaces 20, the cache memories 30A, 30B each have two internal interface signals and associated local ID (LID) information. The switches 40A, 40B each have eight ports (path interfaces 41) and associated port numbers. The forwarding table 46 is a table that associates these LIDs with port numbers. For example, the forwarding table A of the switch 46A indicates that LIDs (1), (3), (5), (7), (9), (11) are connected respectively to the ports a, b, c, d, e, f. By looking up this forwarding table, the packet destination (LED) can be associated with the port to which the packet should be sent.

The switch network that connects the internal interface signal is maintained and managed by, for example, a network management program executed by the processor 36 in the cache memory module 30. The LID information 81 in the network and the forwarding table 46 in the switches is set up and updated by a network management program via the internal interface signal 4.

As an example of standard operations performed by the disk control device of the present invention, the operations performed when the host computer 60 issues a read request to the magnetic disk device 70 by way of the disk control device 100 will be described, with references to FIG. 2, FIG. 6, FIG. 7, and FIG. 8.

First, the host computer 60 issues a data read request to the host interface module 10 to which it is connected. The host interface module 10 receiving this request accesses the resource management module 50 and determines the magnetic disk device 70 in which the requested data is stored and the cache memory module 30 that controls this magnetic disk. The resource management module 50 stores a table that allows this information to be retrieved based on the address of the requested data and can use the requested data to determine the associated cache memory module that handles this data. Next, the host interface module 10 that received the request transfers the read request to the cache memory module 30 managing the requested data. The cache memory module 30 checks to see if the requested data is stored in the cache memory 37. If the data is not in the cache memory module 30, the processor 36 reads the requested data from the magnetic disk device 70 and stores it in the cache memory 37. The cache memory module 30 transfers the requested data stored in the cache memory 37 to the host interface module 10 and sends it to the host computer 60.

When the host interface module 10 or the disk interface module 20 communicates with the cache memory module 30 or the resource management module 50 by way of the switch 40, the switch uses the forwarding table 46 to forward the packets to the destination port.

Figure 16:
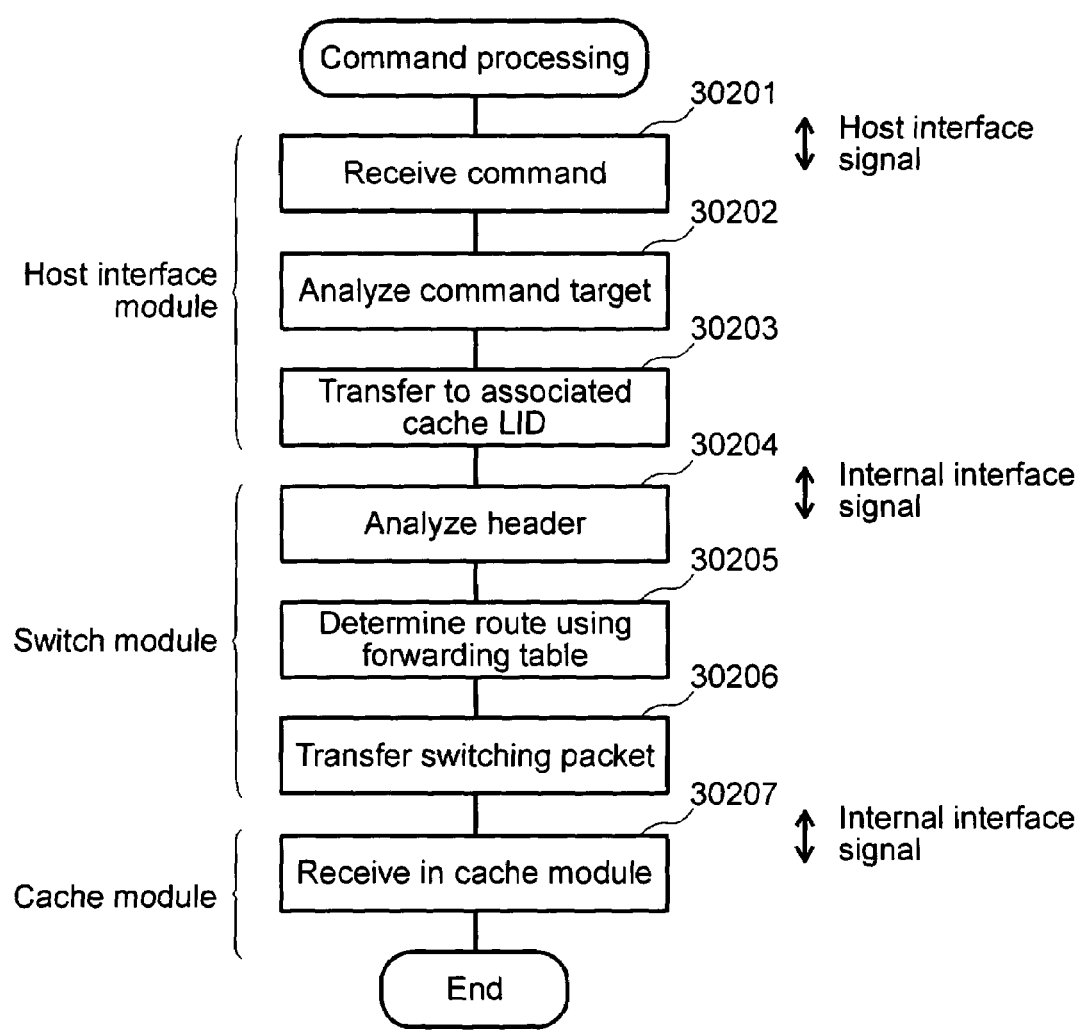
FIG. 16 is a diagram showing an overview of the sending of a command from a host computer to a cache memory module in a disk control device.

FIG. 16 shows a control flow of the request operation from the host computer 60. When the host interface module 10 receives a command from the host computer (30201), it analyzes the target of the command (30202), and transfers the command packet to the target cache by setting the associated cache LID to the destination address of the packet (30203). When the switch 40 receives the command packet, it analyzes the header (30204), and determines the routing ports by using the forwarding table (30205), and transmits the packets to the appropriate port (30206), and the cache memory module 30 receives the command packet (30207).

When the disk interface module 20 communicates with a cache memory module or the host interface module 10 or the disk interface module 20 communicates with the resource management module 50, the packet transfer operation is similar to when the host interface module and a cache memory module communicate.

Figure 17:
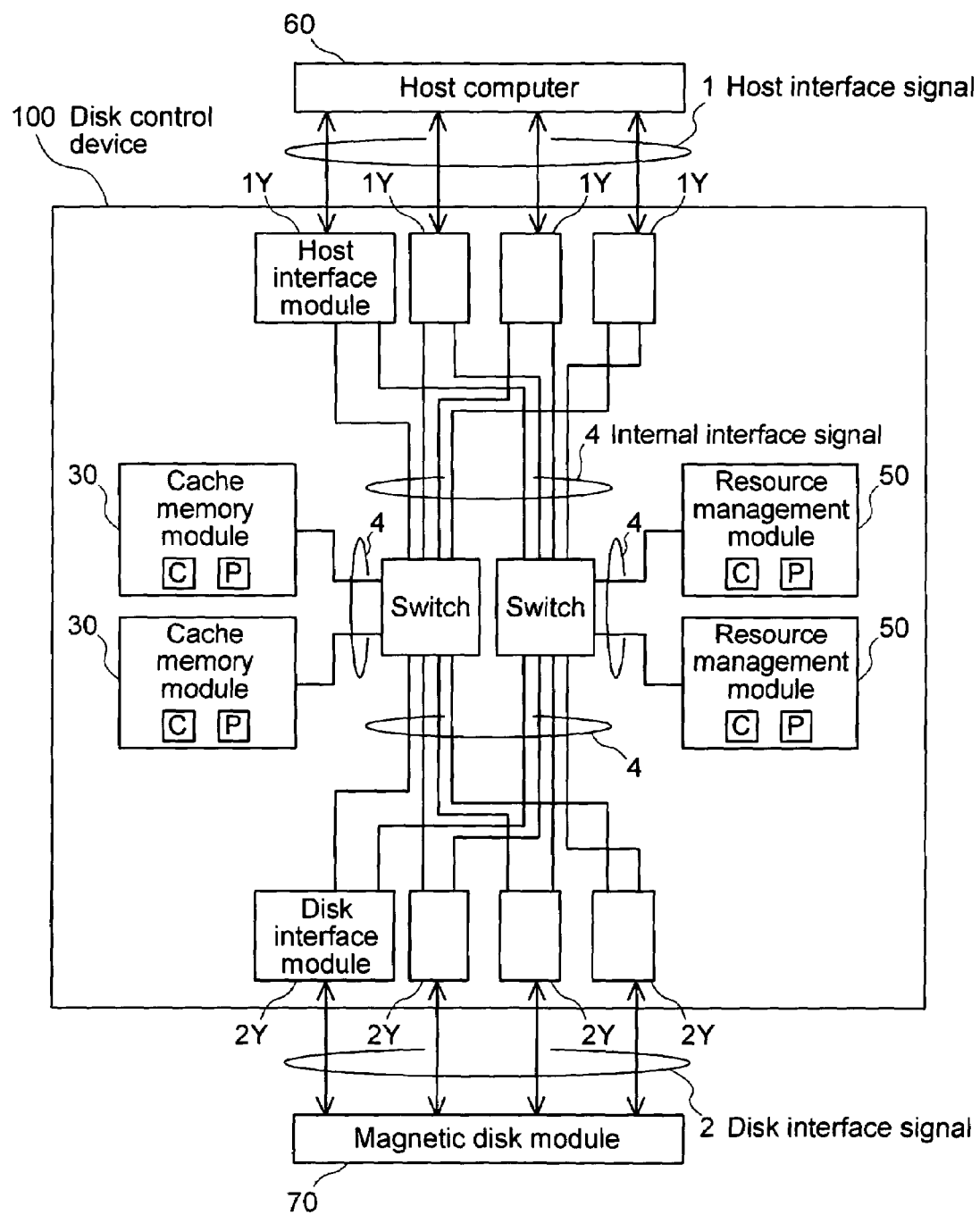
FIG. 17 is a diagram showing the architecture of a disk control device according to the present invention.

The switch network containing the switch 40 used for connecting the resource management module 50 with the host interface module 10 and the disk interface module 20 can be the same switch network used to connect the cache memory module 30 with the host interface module 10 and the disk interface module 20, or a separate, dedicated network can be used. Separate networks are used for the cache memory module 30 and the network for the resource management module 50 in FIG. 17. It would also be possible to have connections made directly without using the switch 40.

Next, as an example of a failure recovery operation characteristic of the present invention, the operations of a path control mechanism and a failure monitoring mechanism between two cache memory modules 30 will be described using FIG. 1 and FIG. 2.

Figure 13:
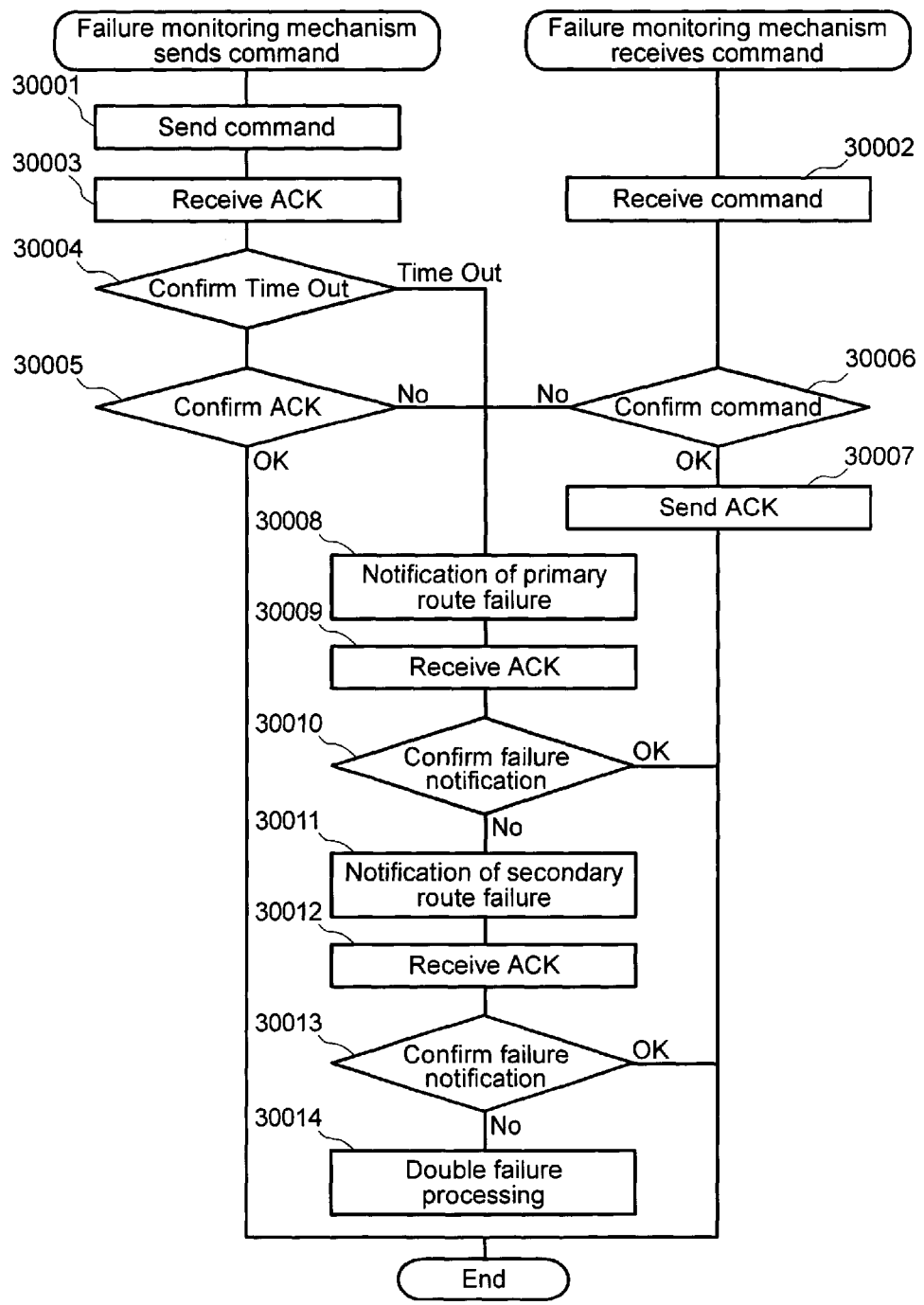
FIG. 13 is a diagram illustrating the operations performed by a failure monitoring mechanism according to the present invention.

In order to provide improved availability, the cache memory modules 30 include master and slave cache memory modules that provide the same functions. The slave cache memory operates in a hot stand-by mode so that if there is a failure in the master cache memory, the slave cache memory takes over the functions thereof. The master cache memory module and the slave cache memory module include failure monitoring mechanisms C to monitor each other by way of the switch 40. More specifically, a packet reporting on its own operating status is generated at fixed intervals so that each module can monitor the status of the other module. FIG. 13 presents an overview of the operations involved. Each time communication takes place, the failure monitoring mechanism checks to see that the sequence and the ACK are correct. When the initiator sends a command (30001), it waits for ACK to be returned from the target (30003). When the target receives a command (30002), it checks the validity of the command (30006) and if the received command has no error, it returns ACK to the initiator (30007). If the ACK is not returned at the initiator or the received packet has an error at the target, each failure monitoring mechanism notifies a failure through a primary route to the other (30008), and waits for ACK of the failure notification (30009). If the failure notification through the primary route fails (30010), the failure monitoring mechanism tries another notification through a secondary route (30011), and waits for ACK of the failure notification (30012) again. If the second notification also fails (30013), a double failure recovery processing is performed (30014).

In the architecture shown in FIG. 2, the master and the slave cache memory modules each have a path control mechanism, so if an irregularity takes place in one of the cache memory modules, the failure information can be immediately detected by the other cache memory module. The cache memory module detecting the failure isolates the cache memory module at which the failure occurred and uses an internal path control mechanism P to change the system structure so that the host interface module 10 and the disk interface module 20 do not access the failed cache memory module.

Figure 14:
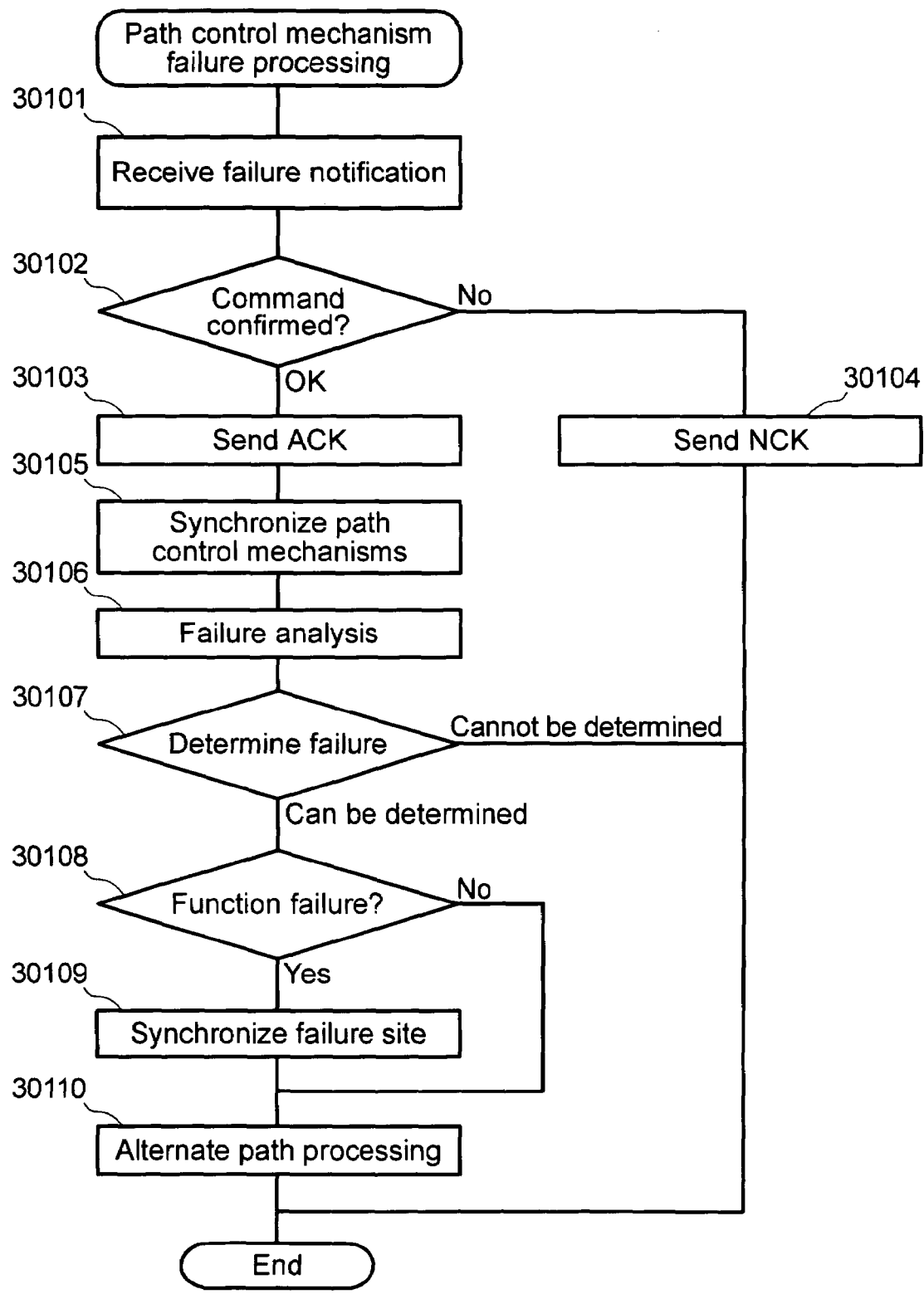
FIG. 14 is a diagram illustrating the operations performed by a path control mechanism according to the present invention.

The path control mechanism P will be described using FIG. 14. When a failure notification is received from a failure monitoring mechanism (30101), the path control mechanism confirms the appropriateness of the notification (30102) and then sends the ACK (30103) and synchronizes the failure information between multiple path control mechanisms set up for high availability (30105). Otherwise, the NCK is sent (30104). Failure analysis (30106) is then performed to determine if the failure can be identified at that point in time. If it cannot, failure processing is delayed until it can. When the failure can be identified (30107), the failure notification information is used to determine if the failure is an access failure or a function failure (30108). If the failure is a function failure, synchronization is attempted for interrupted jobs (30109). Then, a path substitution operation is performed to replace the access path to the failure site with the redundancy zone (30110). More specifically, referring to FIG. 1, if a function failure takes place at the master cache memory module and a fail-over to the slave cache memory module is to be performed, the following would take place. Under normal operations with no failures, the LID and forwarding table values for the host interface module 10, the disk interface module 20, the cache memory modules 30A, 30B, and the switches 40A, 40B are as shown in FIG. 1 (1). When the master cache memory module 30A fails and the failure monitoring mechanism of the slave cache memory module 30B detects the failure, the path control mechanism P of the module 30B makes the module 30B inherit the functions of the module 30A and re-routes the packets addressed to the module 30A to the module 30B. More specifically, the two LIDs (9) and (10) of the module 30A are switched with the two LIDs (11) and (12) of the module 30B, and the forwarding tables 46A and 46B are updated accordingly. As a result, the LIDs and forwarding tables becomes as shown in FIG. 1 (2) and the access operations to the module 30A are all re-routed to the module 30B, thus completing the isolation of the failure site 30A from the system. For the module 30B to inherit the operations performed by the module 30A, the contents of the module 30B must match the contents of the module 30A. This is achieved through normal synchronization operations. More specifically, possible methods include having identical access operations performed on both modules so that modules 30A, 30B have the same contents or periodically copying the data of the two modules.

The resource management modules 50 are also equipped with similar failure monitoring mechanisms C and path control mechanisms P and failure recovery operations are performed using similar procedures. These failure monitoring mechanisms and path control mechanisms can be implemented as control programs executed by the processors 36 in the cache memory module 30 or the resource management modules 50. Also, instead of switching the LID of the slave cache memory module with the LID of the master cache memory module in FIG. 1, it would also be possible to have the LID of the master side added to the slave side. This would provide the advantage of allowing the slave-side LID from before the failure to be still valid after the failure.

With this embodiment, if a failure takes place in the cache memory module 30 or the resource management module 50, the failure site can be isolated simply by updating the forwarding table in the switch 40 and the LID of the cache memory module 30 or the resource management module 50. Thus, unlike the conventional technologies, there is no need to perform broadcast operations between multiple host interface modules 10 and disk interface modules 20 and to perform complex control operations. As a result, it is possible to provide failure recovery processing that can respond to failure quickly and reliably. This prevents performance degradation in the storage system and application malfunctions in the host computer.

Also, the forwarding table in the switch of this embodiment is updated only if a failure takes place. Thus, unlike the conventional technologies, there is no need to provide a complex switch that interprets and updates packet destinations each time a communication operation takes place. As a result, there is no performance degradation at all during normal, failure-free operations, and the technology can be produced at low cost and high reliability.

Second Embodiment

Figure 3:
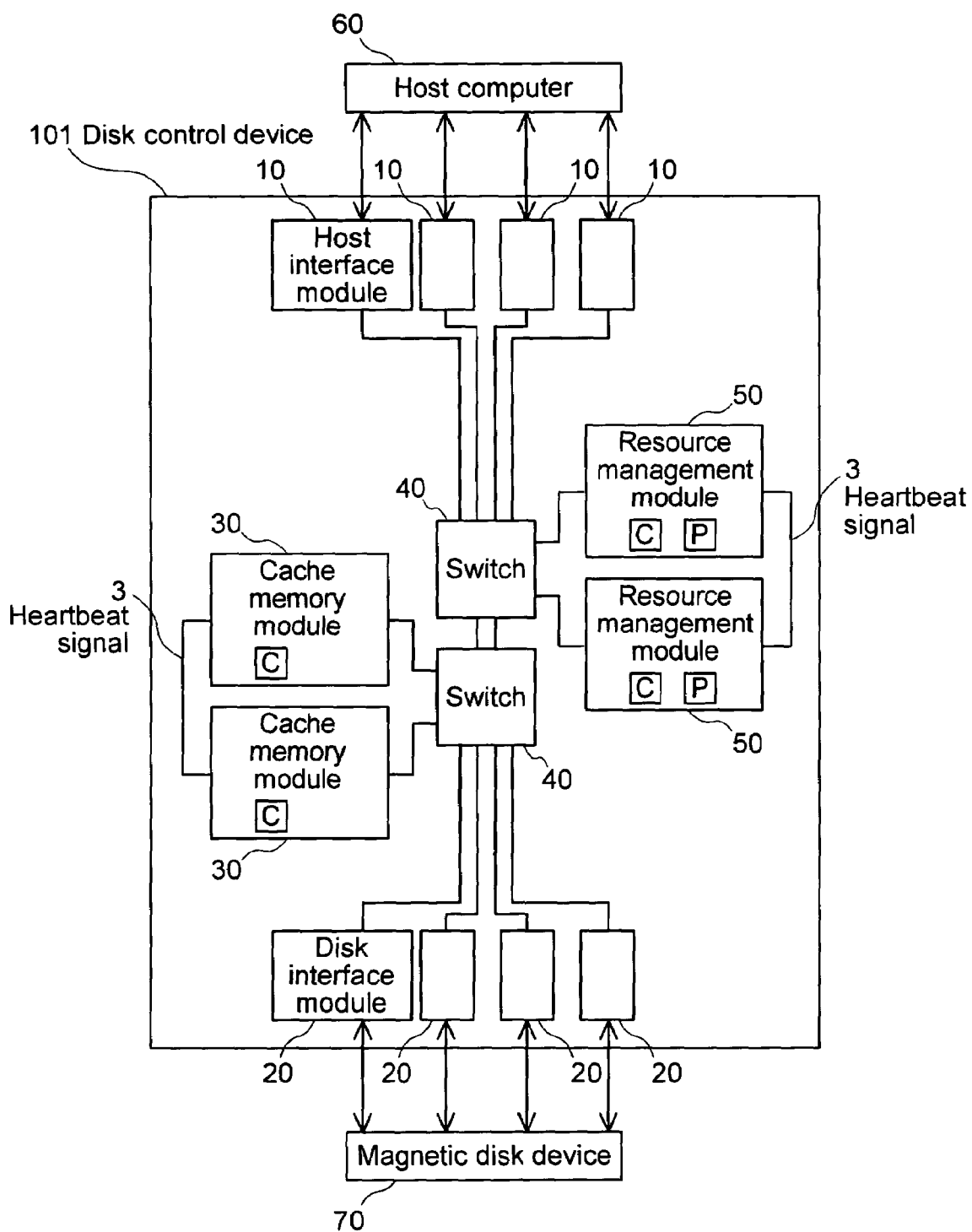
FIG. 3 is a diagram showing the architecture of a disk control device according to the present invention.

FIG. 3 shows another embodiment of the present invention.

The embodiment shown in FIG. 3 is similar to the structure of the first embodiment shown in FIG. 2 except that each of the cache memory modules 30 and the resource management modules 50 are equipped with a heartbeat signal 3, which is a dedicated line for failure notification and that the switch network of the internal interface signal is formed as a multi-stage switch 40. Also, the cache memory 30 is equipped with only the failure monitoring mechanism C and does not include a path control mechanism. The resource management module 50 is equipped with both the failure monitoring mechanism C and the path control mechanism P.

The cache memory modules and the resource management modules are set up with redundancy through master-slave modules, basically storing the same data. However, for data in the cache memory modules read from disks, it would be possible for the master and slave modules to not hold the same contents.

The operations that take place in response to a failure are essentially similar to the first embodiment but will be described briefly using FIG. 18. Failure monitoring mechanisms check periodically for failures in the master/slave cache memory modules and the master/slave resource management modules (30301). When a failure is discovered by a failure monitoring mechanism, the path control mechanism of the resource management module is notified (30302). The path control mechanism analyzes the received failure information to identify the failure site (30303). If the path control mechanism can identify the failure site, the forwarding table in the switch is controlled to set up a path to avoid the failure site, thus completing the isolation of the failure site (30304).

In this embodiment, the use of a dedicated heartbeat signal 3 allows a simpler implementation compared to the first embodiment of the failure monitoring mechanism C for confirming operations of the paired module. More specifically, using the heartbeat signal 3, the operating status of the paired module can be monitored directly. As a result, when an irregularity takes place in one of the slave cache memory modules or resource management modules, the failure information can be detected more quickly by the paired cache memory module or resource management module.

Also, in this embodiment, failure information detected within the cache memory module 30 is notified to the path control mechanism P of the (master) resource management module 50 by way of the switches 40, and the path control mechanism P in the resource management module performs failure recovery for the cache memory module 30. As a result, the failure information can be collected in the resource management module 50 and more appropriate failure recovery operations can be performed.

Also, in this embodiment, the host-side and disk-side interfaces are separated by the switch. This allows flexibility in the number of connections on the host side and disk side, thus making it possible to handle large-scale architectures.

As in the embodiment described previously, this embodiment provides quick and reliable failure recovery operations while preventing storage system performance degradations and host computer application malfunctions. Also, there is no performance degradation at all during failure-free, normal operations, and the system can be produced in a low-cost, reliable manner.

Third Embodiment

Figure 4:
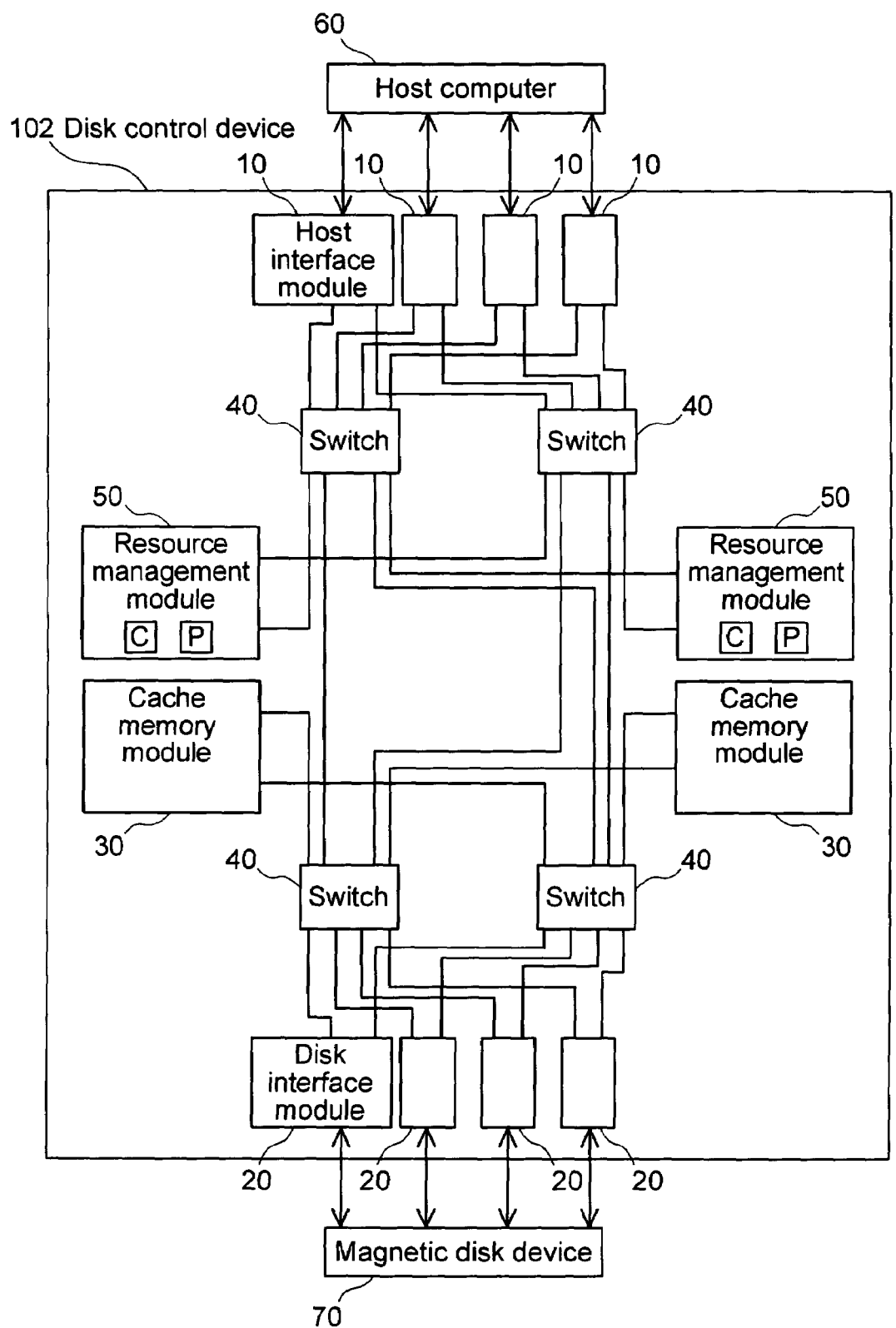
FIG. 4 is a diagram showing the architecture of a disk control device according to the present invention.

FIG. 4 shows another embodiment of the present invention.

The embodiment shown in FIG. 4 is similar in structure to the second embodiment shown in FIG. 3 except that the cache memory modules 30 and the resource management modules 50 are not equipped with the heartbeat signal 3 and the switch network of the internal interface signal has a redundant structure. Also, the cache memory module 30 does not include the failure monitoring mechanism C and the path control mechanism. The resource management module 50 is equipped with both the failure monitoring mechanism C and the path control mechanism P.

In this embodiment, the monitoring of failures in the cache memory module 30 is also performed using the failure monitoring mechanism C in the resource management module 50. One possible implementation of this is to have the failure monitoring mechanism C of the resource management module periodically access the cache memory module 30 in order to monitor the operation status of the cache memory module. Another method would be to have to respond to failure detection during access from the host interface module 10 or the disk interface module 20 to the cache memory module 30 by reporting the failure information to the resource management module. Also, in this embodiment, each host interface module and each disk interface module has multiple ports, and the number of switches is doubled, resulting in multiple paths from the host interface modules and the disk interface modules to the cache memory modules or the resource management modules.

As a result, failure recovery can be provided for path failures between the resource management modules or the cache memory modules and the host interface modules and the disk interface modules in addition to function failures in the resource management modules and the cache memory modules. This provides further improvements in availability.

Also, by grouping the failure monitoring mechanism and the path control mechanism in the resource management module 50, more accurate analysis of failure status is possible. This provides appropriate and reliable failure recovery processing.

As in the embodiment described previously, this embodiment provides quick and reliable failure recovery operations while preventing storage system performance degradations and host computer application malfunctions. Also, there is no performance degradation at all during failure-free, normal operations, and the system can be produced in a low-cost, reliable manner.

Fourth Embodiment

Figure 5:
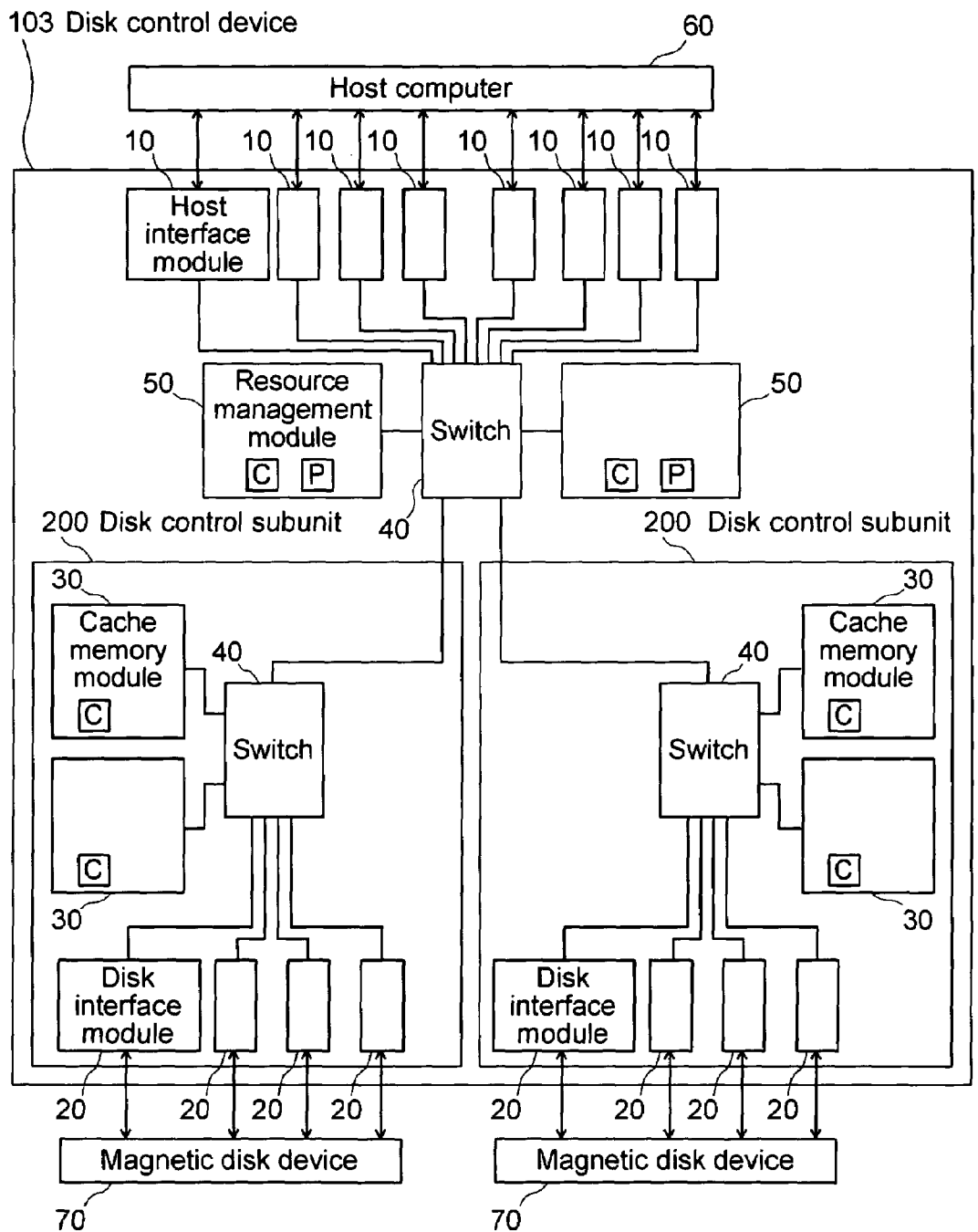
FIG. 5 is a diagram showing the architecture of a disk control device according to the present invention.

FIG. 5 shows another embodiment of the present invention.

The embodiment shown in FIG. 5 is similar in structure to the second embodiment shown in FIG. 3 except that the cache memory modules 30 and the resource management modules 50 are not equipped with the heartbeat signal 3 and that there are multiple disk control subunits 200. Each of the cache memory modules in the multiple disk control subunits is equipped with the failure monitoring mechanism C. The resource management module 50 is equipped with both the failure monitoring mechanism C and the path control mechanism P.

In this embodiment, each disk control subunit 200 has distributed caches. This increases the cache usage efficiency (hit rate) and improves performance while allowing the scale of the system on the host side and the disk side to be expanded in a flexible manner. This makes it possible to provide a highly scalable system.

Also, as in the second embodiment, failure recovery in response to a failure in the cache memory module 30 is performed using the path control mechanism P in the resource management module 50. As in the second and third embodiment, failure information is collected in the resource management module 50 so that more accurate failure status analysis can be performed. This allows appropriate and reliable failure recovery processing for even larger-scale disk control devices using a greater number of disk control subunits 200.

As in the embodiment described previously, this embodiment provides quick and reliable failure recovery operations while preventing storage system performance degradations and host computer application malfunctions. Also, there is no performance degradation at all during failure-free, normal operations, and the system can be produced in a low-cost, reliable manner.

Fifth Embodiment

Figure 15:
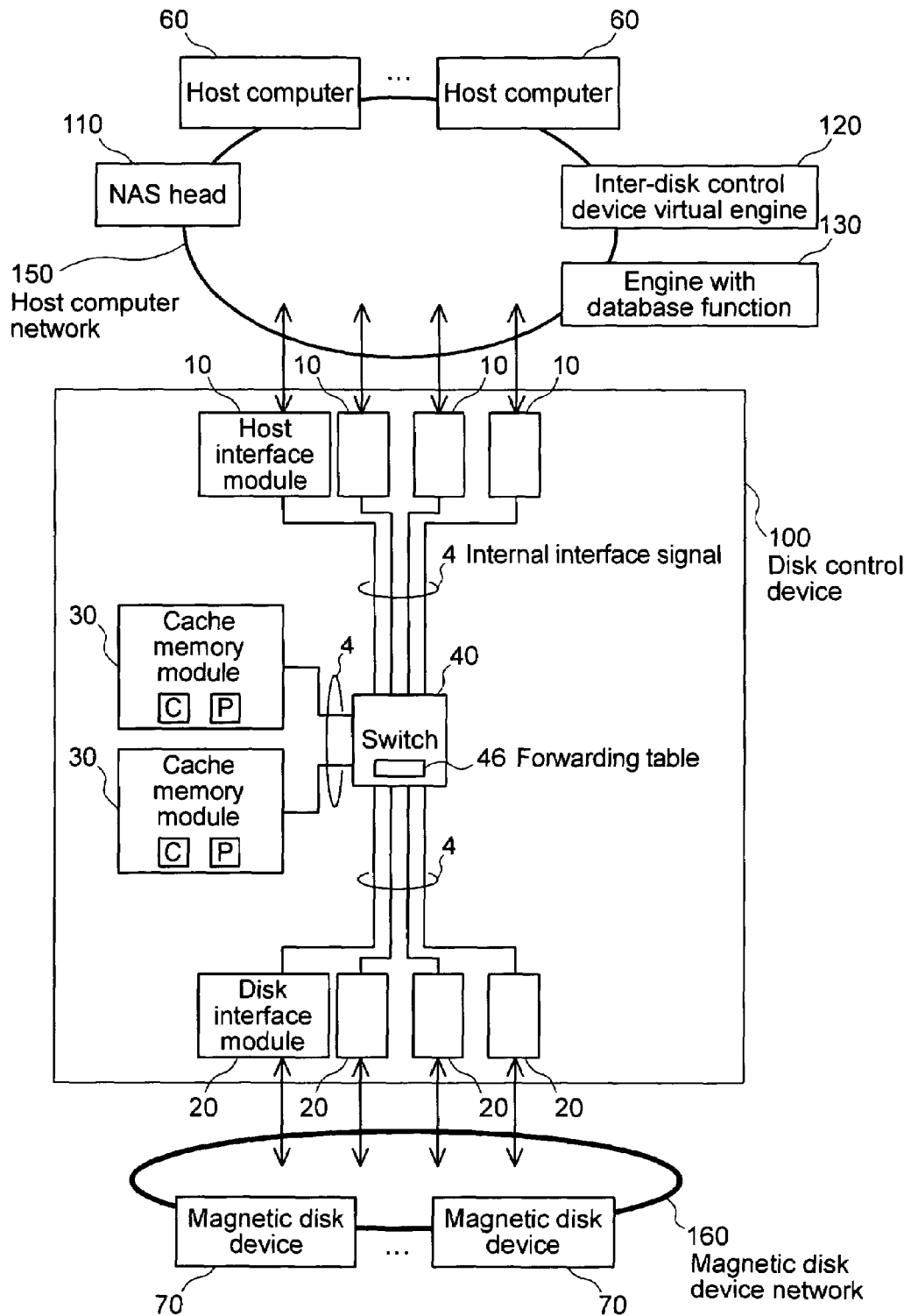
FIG. 15 is a diagram showing an example of a storage system using a disk control device according to the present invention.

FIG. 15 shows another embodiment of the present invention.

In the embodiment shown in FIG. 15, the disk control devices described in the first through the fourth embodiment are connected to multiple host computers via a host computer network and to multiple magnetic disk devices via a magnetic disk device network. The host computer network can be connected to a server 110 (NAS head) for file system processing, a server 120 (disk control device virtual engine) for managing storage for multiple disk control devices, a server 130 (database function add-on engine) for database interface processing, and the like. The NAS head, virtual engine, and database function add-on engine can alternatively be implemented within the disk control device.

By using a disk control device that can perform quick and reliable failure recovery processing, this embodiment can provide a storage system with extremely high availability that does not lead to performance degradation or application malfunctions in the host computers.

As described above, when a failure takes place in the cache memory module 30 or the resource management module 50, the present invention can isolate a failure site by simply updating the forwarding table of the switch 40 and the LIDs of the cache memory module 30 or the resource management module 50. Unlike the conventional technology, there is no need to perform broadcast communication between multiple host interface modules 10 and disk interface modules 20 or to perform complex control operations. As a result, quick and reliable failure recovery processing can be performed if a failure takes place, and performance degradation in the storage system and application malfunctions on the host computers are avoided.

Also, in the present invention, the forwarding table in the switch is updated only in the event of a failure. Unlike the conventional technology, there is no need to perform complex switching involving interpreting and changing packet destinations each time communication takes place. As a result, there is no performance degradation at all during normal failure-free operations and the system can be produced at low cost and in a highly reliable manner.

In the present invention, failure notification from the failure monitoring mechanism is analyzed by the path control mechanism and a forwarding table is controlled. This allows the present invention to handle flexible system structures. In particular, in large-scale disk control devices with multiple disk control subunits, failure information from multiple failure monitoring mechanisms can be collected by the path control mechanism to provide more reliable failure status analysis, thus providing highly reliable failure recovery processing.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A disk control device comprising:
    a plurality of host interface modules configured to interface with a computer;
    a plurality of disk interface modules configured to interface with a storage device;
    a plurality of cache memory modules configured to temporarily store data read from or written to the storage device; and
    a switch network connecting the host interface modules, the cache memory modules, and the disk interface modules, the switch network comprising at least one switch;
    wherein each of the host interface modules is configured to execute data transfers between the computer and the cache memory modules, and each of the disk interface modules is configured to execute data transfers between the storage device and the cache memory modules;

wherein each of the host interface modules, the disk interface modules, and the cache memory modules includes identification information providing unique identification within the switch network;

wherein the switch network includes a memory containing path information based on the identification information for data transfer paths among the host interface modules, the disk interface modules, and the cache memory modules; and wherein each of the cache memory modules is configured to monitor failure in the cache memory module and to control changing of the path information relating to the cache memory module in the memory of the switch network.

2. A disk control device as recited in claim 1 wherein each of the host interface modules, the disk interface modules, and the cache memory modules includes at least one identification corresponding to at least one port thereof.

3. A disk control device as recited in claim 1 wherein each cache memory module is activated to monitor failure in the cache memory module in tandem with read or write operations in the host interface modules and the disk interface modules.

4. A disk control device as recited in claim 1 wherein each cache memory module is configured to control changing of the path information in the memory of the switch network to avoid a failure site when a failure takes place in the cache memory module.

5. A disk control device as recited in claim 1 wherein, when one of the cache memory modules detects a failure, the cache memory module replaces the identification information of the failed cache memory module with the identification information of a replacement cache memory module inheriting functions of the failed cache memory module, and wherein the path information for data transfer paths in the memory of the switch network is changed in accordance with replacement of the identification information of the failed cache memory module by the identification information of the replacement cache memory module.

6. A disk control device comprising:
   a plurality of host interface modules configured to interface with a computer;
   a plurality of disk interface modules configured to interface with a storage device;
   a plurality of cache memory modules configured to temporarily store data read from or written to the storage device;
   a plurality of resource management modules configured to store control information relating to data transfer among the cache memory modules and the host interface modules and the disk interface modules; and
   a switch network connecting the host interface modules, the cache memory modules, the resource management modules, and the disk interface modules, the switch network comprising at least one switch;
   wherein each of the host interface modules is configured to execute data transfers between the computer and the cache memory modules; and each of the disk interface modules is configured to execute data transfers between the storage device and the cache memory modules;
   wherein each of the host interface modules, the disk interface modules, the resource management modules, and the cache memory modules includes identification information providing unique identification within the switch network;
   wherein the switch network includes a memory containing path information based on identification information for data transfer paths among the host interface modules, the disk interface modules, the resource management modules, and the cache memory modules;
   wherein each of the resource management modules is configured to monitor failure in the resource management module and to control changing of the path information relating to the resource management module in the memory of the switch network.

7. A disk control device as recited in claim 6 wherein each of the cache memory modules is configured to monitor failure in the cache memory module.

8. A disk control device as recited in claim 7 wherein each of the cache memory modules is configured to control changing of the path information relating to the cache memory module in the memory of the switch network.

9. A disk control device as recited in claim 8 wherein each cache memory module is configured to control changing of the path information in the memory of the switch network, when a failure takes place in the cache memory module, to avoid the failed cache memory module.

10. A disk control device as recited in claim 6 wherein each resource management module is configured to control changing of the path information in the memory of the switch network, when a failure takes place in the resource management module or in one of the cache memory modules, to avoid the failed resource management module or the failed cache memory module.

11. A disk control device as recited in claim 6 wherein each resource management module is configured to monitor failure in the resource management module or in one of the cache memory modules.

12. A disk control device as recited in claim 6 wherein each resource management module is activated to monitor failure in tandem with read or write operations in the host interface modules and the disk interface modules.

13. A disk control device as recited in claim 6 wherein, when one of the resource management modules detects a failure in the resource management module, the resource management module replaces the identification information of the failed resource management module with the identification information of a replacement resource management module inheriting functions of the failed resource management module, and wherein the path information for data transfer paths in the memory of the switch network is changed in accordance with replacement of the identification information of the failed resource management module by the identification information of the replacement resource management module.

14. A disk control device comprising:
   a plurality of host interface modules configured to interface with a computer;
   a plurality of disk interface modules configured to interface with a storage device;
   a plurality of cache memory modules configured to temporarily store data read from or written to the storage device; wherein each of the host interface modules is configured to execute data transfers between the computer and the cache memory modules, and each of the disk interface modules is configured to execute data transfers between the storage device and the cache memory modules; wherein each of the host interface modules, the disk interface modules, and the cache memory modules includes identification information providing unique identification;

means for connecting the host interface modules, the cache memory modules, and the disk interface modules; and means for providing a memory containing path information based on identification information for data transfer paths among the host interface modules, the disk interface modules, and the cache memory modules, and for changing the path information for the data transfer paths in the memory, when a failure takes place in one of the cache memory modules, to avoid a failed cache memory module.

15. A disk control device as recited in claim 14 wherein each of the cache memory modules is configured to monitor failure in the cache memory module.

16. A disk control device as recited in claim 14 further comprising means for changing the identification information.

17. A disk control device comprising:
a plurality of host interface modules configured to interface with a computer;
a plurality of disk interface modules configured to interface with a storage device;
a plurality of cache memory modules configured to temporarily store data read from or written to the storage device;
a plurality of resource management modules configured to store control information relating to data transfer among the cache memory modules and the host interface modules and the disk interface modules; wherein each of the host interface modules is configured to execute data transfers between the computer and the cache memory modules, and each of the disk interface modules is configured to execute data transfers between the storage device and the cache memory modules; wherein each of the host interface modules, the disk interface modules, the resource management modules, and the cache memory modules includes identification information providing unique identification;
means for connecting the host interface modules, the cache memory modules, the resource management modules, and the disk interface modules; and
means for providing a memory containing path information based on identification information for data transfer paths among the host interface modules, the disk interface modules, the resource management modules, and the cache memory modules, and for changing the path information for the data transfer paths in the memory, when a failure takes place in one of the cache memory modules or the resource management modules, to avoid a failed module.

18. A disk control device as recited in claim 17 wherein each of the resource management modules is configured to monitor failure in the resource management module or in one of the cache memory modules.

19. A failure recovery processing method for a disk control device, the method comprising:
providing a plurality of host interface modules configured to interface with a computer;
providing a plurality of disk interface modules configured to interface with a storage device;
providing a plurality of cache memory modules configured to temporarily store data read from or written to the storage device; wherein each of the host interface modules is configured to execute data transfers between the computer and the cache memory modules, and each of the disk interface modules is configured to execute data transfers between the storage device and the cache memory modules; wherein each of the host interface modules, the disk interface modules, and the cache memory modules includes identification information providing unique identification;

connecting the host interface modules, the cache memory modules, and the disk interface modules;

providing a memory containing path information based on identification information for data transfer paths among the host interface modules, the disk interface modules, and the cache memory modules; and changing the path information for the data transfer paths in the memory, when a failure takes place in one of the cache memory modules, to avoid a failed cache memory module.

20. A failure recovery processing method as recited in claim 19 wherein changing the path information comprises changing the identification information.

21. A failure recovery processing method as recited in claim 19 further comprising monitoring failure in the cache memory modules.

22. A failure recovery processing method as recited in claim 21 wherein each of the cache memory modules is configured to monitor failure in the cache memory module.

23. A failure recovery processing method as recited in claim 22 wherein each of the cache memory modules is configured to control changing of the path information when a failure takes place.

24. A failure recovery processing method as recited in claim 21 wherein monitoring a failure in one of the cache memory modules takes place during a read or write operation in the host interface module or the disk interface module.

25. A failure recovery processing method as recited in claim 19 further comprising:
providing a plurality of resource management modules configured to store control information relating to data transfer among the cache memory modules and the host interface modules and the disk interface modules, each of the plurality of resource management modules including identification information providing unique identification;
connecting the plurality of resource management modules with the host interface modules, the disk interface modules, and the cache memory modules; and
changing the path information for the data transfer paths in the memory, when a failure takes place in one of the resource management modules, to avoid a failed resource management module.

26. A failure recovery processing method as recited in claim 25 further comprising monitoring failure in the resource management modules.

27. A failure recovery processing method as recited in claim 26 wherein each of the resource management modules is configured to monitor failure in the resource management module or in one of the cache memory modules.

28. A failure recovery processing method as recited in claim 27 wherein each of the resource management modules is configured to control changing of the path information when a failure takes place in the resource management module or in one of the cache memory modules.

29. A failure recovery processing method as recited in claim 26 wherein each of the resource management modules is configured to control changing of the path information when a failure takes place in the resource management module.

30. A failure recovery processing method as recited in 19 wherein changing the path information comprises:

swapping the identification information of the failed cache memory module with the identification information of a replacement cache memory module which will inherit functions of the failed cache memory module; and changing the path information for the data transfer paths in the memory based on the swapping of the identification information.

31. A failure recovery processing method as recited in claim 19 wherein the storage device comprises a magnetic disk device.

32. A disk array system for connecting to a plurality of computers via a first network, the disk array system comprising:

a plurality of magnetic disk devices and a disk control device connected via a second network;

wherein the disk control device comprises a plurality of host interface modules including an interface with the computers; a plurality of disk interface modules including an interface with the magnetic disk devices; and a plurality of cache memory modules connected between the plurality of host interface modules and the plurality of disk interface modules via a switch network having at least one switch;

wherein the plurality of host interface modules, the plurality of disk interface modules, and the plurality of cache memory modules each include an ID providing unique identification within the switch network;

wherein the switch includes a memory containing path information based on the IDs for data transfer paths among the host interface modules, the disk interface modules, and the cache memory modules; and wherein the disk control device comprises means for changing the path information in the memory of the switch and the IDs wherein each of the plurality of cache memory modules is configured to monitor failure in the plurality of cache memory modules; and to control changing of the path information relating to the cache memory module in the memory of the switch.

33. A disk array system as recited in claim 32 further comprising:

a plurality of resource management modules configured to store control information relating to data transfer among the cache memory modules and the host interface modules and the disk interface modules, each of the plurality of resource management modules including identification information providing unique identification;

wherein the plurality of resource management modules are connected with the host interface modules, the disk interface modules, and the cache memory modules; and wherein each of the resource management modules is configured to control changing of the path information for the data transfer paths in the memory of the switch, when a failure takes place in one of the resource management modules, to avoid a failed resource management module.

34. A disk array system as recited in claim 33 wherein each of the resource management modules is configured to monitor failure in the resource management module or in one of the cache memory modules.

35. A disk array system as recited in claim 34 wherein each of the resource management modules is configured to control changing of the path information when a failure takes place in the resource management module or in one of the cache memory modules.

36. A disk array system as recited in claim 33 wherein each of the resource management modules is configured to monitor failure in the resource management module; and to control changing of the path information when a failure takes place in the resource management module.

37. A disk control device comprising:

a plurality of host interface modules configured to interface with a computer;

a plurality of disk interface modules configured to interface with a storage device;

a plurality of cache memory modules configured to temporarily store data read from or written to the storage device; and a switch network connecting the host interface modules, the cache memory modules, and the disk interface modules, the switch network comprising a processor and a memory storing a program executable by the processor;

wherein each of the host interface modules is configured to execute data transfers between the computer and the cache memory modules, and each of the disk interface modules is configured to execute data transfers between the storage device and the cache memory modules;

wherein each of the host interface modules, the disk interface modules, and the cache memory modules includes identification information providing unique identification within the switch network;

wherein the memory of the switch network includes path information based on the identification information for data transfer paths among the host interface modules, the disk interface modules, and the cache memory modules; and wherein the program in the memory of the switch network includes a code module for changing the path information relating to the cache memory modules in response to an instruction from one of the cache memory modules upon detecting failure in the cache memory module.

38. A disk control device as recited in claim 37 further comprising a plurality of resource management modules configured to store control information relating to data transfer among the cache memory modules and the host interface modules and the disk interface modules, and wherein the program in the memory of the switch network includes a code module for changing the path information relating to the resource management modules in response to an instruction from one of the resource management modules upon detecting failure in the resource management module.

* * * * *